US012533279B2

(12) United States Patent
Shuai

(10) Patent No.: US 12,533,279 B2
(45) Date of Patent: Jan. 27, 2026

(54) CAM AND NON-CIRCULAR GEAR PAIR FOR UNPOWERED MULTI-JOINT SYNCHRONOUS TRAINING DEVICE, MANUFACTURING METHOD THEREOF, TRANSMISSION MECHANISM USING THE SAME, AND UNPOWERED MULTI-JOINT SYNCHRONOUS TRAINING DEVICE

(71) Applicant: Beijing Ai-Robotics Technology Co., Ltd., Beijing (CN)

(72) Inventor: Mei Shuai, Beijing (CN)

(73) Assignee: BEIJING AI-ROBOTICS TECHNOLOGY CO., LTD., Beijing (CN)

( * ) Notice: Subject to any disclaimer, the term of this patent is extended or adjusted under 35 U.S.C. 154(b) by 1058 days.

(21) Appl. No.: 17/625,540

(22) PCT Filed: Sep. 6, 2019

(86) PCT No.: PCT/CN2019/104720
§ 371 (c)(1),
(2) Date: Jan. 7, 2022

(87) PCT Pub. No.: WO2021/003835
PCT Pub. Date: Jan. 14, 2021

(65) Prior Publication Data

US 2022/0331186 A1 Oct. 20, 2022

(30) Foreign Application Priority Data

Jul. 8, 2019 (WO) ................ PCT/CN2019/095130

(51) Int. Cl.
*A61H 1/02* (2006.01)
*A61H 3/04* (2006.01)

(52) U.S. Cl.
CPC ............. *A61H 1/0262* (2013.01); *A61H 3/04* (2013.01); *A61H 2201/1261* (2013.01);
(Continued)

(58) Field of Classification Search
CPC .......... A61H 1/00; A61H 1/02; A61H 1/0237; A61H 1/0262; A61H 3/00; A61H 3/008;
(Continued)

(56) References Cited

U.S. PATENT DOCUMENTS 2,210,269 A * 8/1940 Taylor .................. A61H 1/0255 280/211

FOREIGN PATENT DOCUMENTS

CN 2279163 Y 4/1998
CN 2298847 Y 12/1998
(Continued)

*Primary Examiner* — Rachel T Sippel
(74) *Attorney, Agent, or Firm* — MUNCY, GEISSLER, OLDS & LOWE, P.C.

(57) ABSTRACT

The invention provides a cam for an unpowered multi joint synchronous training device, wherein the cam has a circular main body, a cam slot is disposed on a first side surface of the circular main body, and a contour of the cam slot is configured such that rotational movement of the cam drives a follower provided in the cam slot to perform variable-speed reciprocation motion along a predetermined horizontal axis, wherein for each rotation of the cam, the follower performs reciprocating motion once between a first position and a second position; the first position and the second position are respectively positions of the follower along the horizontal axis when the follower is at positions of the contour closest to, and farthest from, a center of the circular main body; and the reciprocating motion drives a driven object connected to the follower to perform variable-speed oscillation within a range of an angle. The invention further provides a non-circular gear pair for an unpowered multi joint synchronous training device, a method of manufactur-
(Continued)

ing the cam and the non-circular gear pair, a transmission mechanism using the cam and the non-circular gear pair, and an unpowered multi joint synchronous training device using the transmission mechanism.

22 Claims, 13 Drawing Sheets

(52) U.S. Cl.
CPC ................ *A61H 2201/1418* (2013.01); *A61H 2201/1463* (2013.01); *A61H 2201/1642* (2013.01); *A61H 2201/165* (2013.01); *A61H 2203/0406* (2013.01)

(58) Field of Classification Search
CPC ................ A61H 3/04; A61H 2003/007; A61H 2003/043–046; A61H 2203/0406; A61H 2201/1253–1261; A61H 2201/1418; A61H 2201/1463; A61H 2201/164–1642; A61H 2201/165; A61H 2205/106
See application file for complete search history.

(56) References Cited

FOREIGN PATENT DOCUMENTS

| | | | |
|---|---|---|---|
| CN | 202659811 | U | 1/2013 |
| CN | 103006416 | A | 4/2013 |
| CN | 105456002 | A | 4/2016 |
| CN | 105963107 | A | 9/2016 |
| CN | 106236512 | A | 12/2016 |
| CN | 107387710 | A | 11/2017 |
| CN | 108186285 | A | 6/2018 |
| CN | 109758342 | A | 5/2019 |
| JP | S5919761 | A | 2/1984 |
| JP | H09318226 | A | 12/1997 |
| JP | H10188243 | A | 7/1998 |
| JP | 2000337469 | A | 12/2000 |
| JP | 2003000661 | A | 1/2003 |
| JP | 2004340380 | A | 12/2004 |
| JP | 2012081033 | A | 4/2012 |
| JP | 2013208345 | A | 10/2013 |
| JP | 2019011833 | A | 1/2019 |
| WO | WO2019131152 | A1 | 7/2019 |

* cited by examiner

CAM AND NON-CIRCULAR GEAR PAIR FOR UNPOWERED MULTI-JOINT SYNCHRONOUS TRAINING DEVICE, MANUFACTURING METHOD THEREOF, TRANSMISSION MECHANISM USING THE SAME, AND UNPOWERED MULTI-JOINT SYNCHRONOUS TRAINING DEVICE

FIELD

The invention relates to a transmission mechanism and a rehabilitation training device, and specifically, designs a transmission mechanism for an unpowered multi-joint synchronous training device, and an unpowered multi-joint synchronous training device having the same.

BACKGROUND

With increase of the number of physically-challenged persons, the aged occupies a large proportion. As is shown in results of the second national sample survey on the disabled persons, currently, the national physically-challenged patients are about 24 millions, and progressive increase by millions every year. With continuous intensifying of the degree of aging of population in China, the physically-challenged persons caused by cerebrovascular disease are also growing.

The survey also shows that the requirement for medical assistance, support and rehabilitation service to the increasing physically-challenged persons becomes larger, and currently, the rehabilitation techniques in China are also one-to-one rehabilitation treatment with traditional rehabilitation devices and rehabilitation technicians, so a large number of rehabilitation technicians shall participate therein.

Some families miss the optimum rehabilitation time due to economic issue, and clinical research shows that most of hemiplegic patients can partially or wholly restore function of limb movement when performing rehabilitation training with rehabilitation training devices.

Currently, many scientific research institutions and corporations in China have begun in development of the rehabilitation training devices, but cost of development of intelligent devices is high, and it is difficult for the families of normal patients to bear such high cost. Meanwhile, relative to one-to-one unarmed training mainly depending on therapists of the traditional rehabilitation treatment of limb function disability, training intensity, durability and treatment effect also cannot be effectively ensured.

Therefore, a lower limb rehabilitation training device for use of ordinary patients shall be developed, which ensures intensity of rehabilitation training, durability and treatment effect.

SUMMARY

An object of the invention is to provide an advised lower limb rehabilitation training device, which may provide one-to-one rehabilitation training to limb function disabled patients only through simple operation of therapists or operators without having electric arrangement and corresponding complex control program.

To realize the object, according to one aspect, the invention provides a cam for an unpowered multi joint synchronous training device, wherein the cam has a circular main body, a cam slot is disposed on a first side surface of the circular main body, and a contour of the cam slot is configured such that rotational movement of the cam drives a follower provided in the cam slot to perform variable-speed reciprocation motion along a predetermined horizontal axis, wherein, for each rotation of the cam, the follower performs reciprocating motion once between a first position and a second position on the predetermined horizontal axis;

the first position is a position of the follower along the horizontal axis when the follower is at a position of the contour closest to a center of the circular main body, and the second position is a position of the follower along the horizontal axis when the follower is at the position of the contour farthest from the center of the circular main body; and the reciprocating motion drives a driven object connected to the follower to perform variable-speed oscillation within a range of an angle.

According to another aspect, the invention further provides a non-circular gear pair for an unpowered multi joint synchronous training device, comprising a driving non-circular gear and a driven non-circular gear in driving engagement with the driving non-circular gear, wherein, the driving non-circular gear and the driven non-circular gear have the same number of teeth and a fixed center distance, a pitch line of the driving non-circular gear and the driven non-circular gear is configured such that for each rotation of the driving non-circular gear, the driving non-circular gear drives a follower disposed on a first side surface of the driven non-circular gear to perform variable-speed reciprocating motion once between a first position and a second position;

the first position is a position of the follower closest to an axis of rotation of the driving non-circular gear, and the second position is a position of the follower farthest from the axis of rotation of the driving non-circular gear; and the variable-speed reciprocating motion drives a driven object connected to the follower to perform variable-speed oscillation within a range of an angle.

According to another aspect, the invention further provides a method of manufacturing a cam, comprising the steps of:

(a) providing a circular main body, and disposing a follower on a side surface of the circular main body, the follower being movable on the side surface only in a horizontal direction;

(b) allowing the follower to perform variable-speed reciprocating motion once between a first position and a second position on the side surface of a disk sheet;

(c) rotating the disk sheet at a constant speed while executing the step (b), wherein a period when the follower performs the variable-speed reciprocating motion once is the same as a period when the disk sheet rotates once; and (d) taking a trace of movement of the follower on the side surface of the disk sheet as a cam contour to form a cam slot on the side surface of the circular main body, wherein a distance between the first position and a center of the circular main body is equal to a distance between a position of the cam contour closest to the center and the center, and a distance between the second position and the center is equal to a distance between a position of the cam contour farthest from the center and the center.

According to another aspect, the invention further provides a method of manufacturing a non-circular gear pair, comprising the steps of:

providing a driving non-circular gear and a driven non-circular gear engaged with each other, wherein the driving non-circular gear and the driven non-circular gear have the same number of teeth and a fixed center distance, and disposing a follower on a side surface of the driven non-circular gear, wherein a pitch line of the driving non-circular gear and the driven non-circular gear is configured such that for each rotation of the driving non-circular gear, the driving non-circular gear drives the follower to perform variable-speed reciprocating motion once between a first position and a second position, wherein, the first position is a position of the follower closest to an axis of rotation of the driving non-circular gear, and the second position is a position of the follower farthest from the axis of rotation of the driving non-circular gear; and the variable-speed reciprocating motion drives a driven object connected to the follower to perform variable-speed oscillation within a range of an angle.

According to another aspect, the invention further provides a transmission mechanism for an unpowered multi joint synchronous training device, comprising:

a wheel assembly;

a transmission assembly in driving connection with the wheel assembly;

a drive assembly in driving connection with the transmission assembly, and having the cam as described; and a leg rod assembly connected to the drive assembly through a connecting rod, such that the leg rod assembly oscillates under driving of the transmission assembly.

According to another aspect, the invention further provides an unpowered multi joint synchronous training device, comprising:

a body frame; and a first transmission mechanism and a second transmission mechanism mounted on both sides of the body frame, and being the transmission mechanism as described; wherein, a drive assembly of the first transmission mechanism and a drive assembly of the second transmission mechanism are connected by a shaft lever, and have a directional difference of 180°.

DETAILED DESCRIPTION

Figure 1:
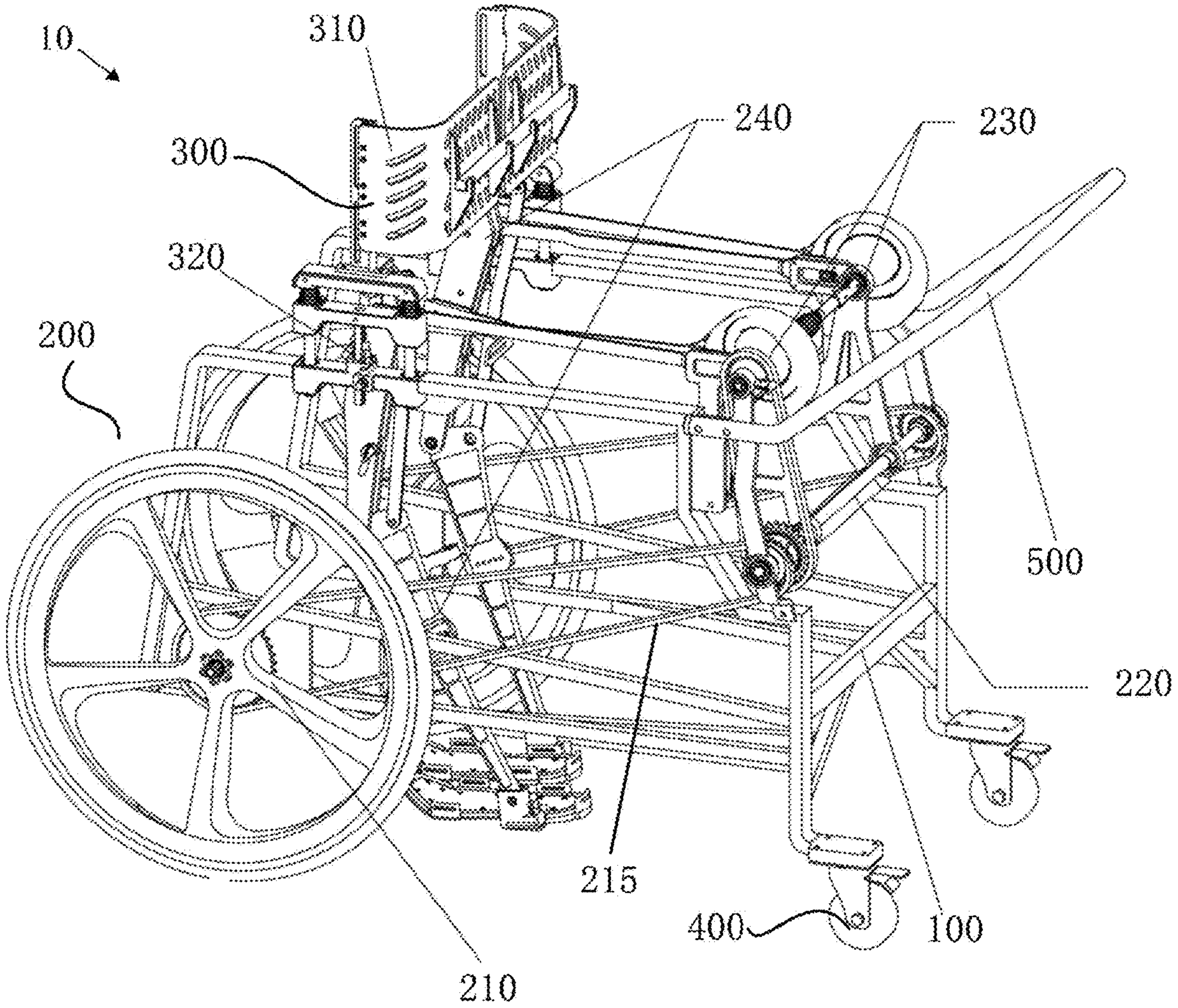
FIG. 1 is a perspective diagram of an unpowered multi joint synchronous training device according to one embodiment of the invention.

To make features and advantages of the invention clearer, hereinafter the invention is further explained with reference to the accompanying drawings. It shall be noticed that the embodiments illustrated in the drawings are provided to explain the invention, and shall not be viewed as limit to the invention.

Referring to FIG. 1, FIG. 1 illustrates an unpowered multi joint synchronous training device 10 according to one embodiment of the invention. As shown in FIG. 1, the training device 10 is formed by a body frame 100, a pair of transmission mechanisms 200 attached to the body frame 100, a waist retainer 300, a pair of universal wheels 400 and a handrail 500. When the training device is used, a patient for walk rehabilitation training is fixed to a front part (i.e., a left side in FIG. 1) of the training device 10, and another medical worker or other operator assisting for rehabilitation training is at a back part (i.e., a right side in FIG. 1) of the training device 10. The medical worker or other operator holds the handrail tightly, and slowly pushes the training device 10 forward. Under action of the transmission mechanisms 200, a driving force for pushing the training device 10 forward is converted into an acting force applied to leg (e.g., a thigh portion and/or a lower leg portion) of the patient, and the acting force enables the leg of the patient to oscillate following a given rule with hip of the patient as an axis, such that the patient can step forward along with the training device 10 in a walking gait of a normal person, thereby realizing the object of walk rehabilitation training.

In some embodiments of the invention, the pair of universal wheels 400 is disposed at a back side of bottom of the body frame 100. Preferably, the pair of universal wheels 400 is a pair of 4 inches universal silent brake casters that provides balance and stability performance for the training device when stepping and at rest. Of course, it depends on a size of the body frame, and other sizes of universal wheels also can be used. Moreover, types of the universal wheels are not particularly limited, only if the balance and stability performance can be realized.

Hereinafter the transmission mechanisms 200 and the waist retainer 300 are described in detail.

As for the transmission mechanisms 200, as is further shown in FIG. 1, the training device 10 has a pair of transmission mechanisms 200 disposed on both sides (i.e., front and back in FIG. 1) of the body frame, and the pair of transmission mechanisms 200 has the same structure. As shown in FIG. 1, the transmission mechanism 200 comprises a wheel assembly 210, a transmission assembly 220, a drive assembly 230 and a leg rod assembly 240 attached to the body frame 100 at suitable positions, respectively. For example, the wheel assembly 210 is disposed on a lower front side of the body frame 100, the transmission assembly 220 is disposed on a middle back side of the body frame 100, the drive assembly 230 is disposed on an upper back side of the body frame 100, and the leg rod assembly 240 is disposed in a front portion of the body frame 100, and extends from an upper portion to a lower portion of the body frame 100.

Figure 2:
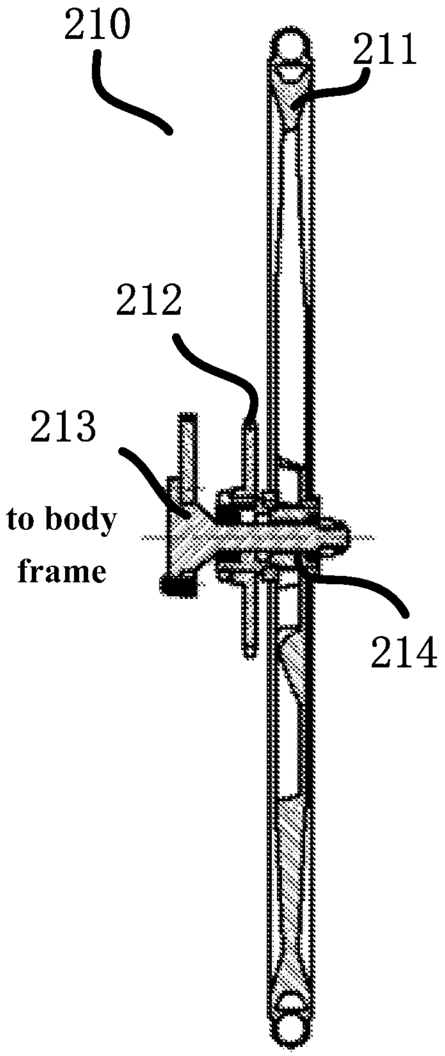
FIG. 2 is a sectional view of a wheel assembly of the unpowered multi joint synchronous training device in FIG. 1.

Referring to FIG. 2, FIG. 2 is a sectional view of the wheel assembly 210 of the transmission assembly 220. As shown in FIG. 2, the wheel assembly 210 comprises a wheel body 211, a chain wheel 212, a mounting shaft 213 and a bearing assembly 214. Preferably, the wheel body 211 is a 700C integrated wheel, such that a bottom of the wheel body 211 and a bottom of the universal wheels 400 are on the same horizontal plane, and the training device 10 can stably contact the ground. The chain wheel 212 and the wheel body 211 are coaxial, and connected to each other via the mounting shaft 213 and the bearing assembly 214, such that the chain wheel 212 and the wheel body 211 can rotate synchronously. The mounting shaft 213 is fixed onto the body frame 100. In this embodiment, the wheel assembly 210 is in driving connection with the transmission assembly 220 explicitly described below through the chain wheel 212. For example, as shown in FIG. 1, the chain wheel 212 of the wheel assembly 210 is in driving connection with the transmission assembly 220 via a transmission belt 215. When the wheel body 211 rotates, a driving force (or a twisting force) for rotating the wheel body 211 is delivered to the transmission assembly 220 via the transmission belt 215, such that the transmission assembly 220 can rotate along with rotation of the wheel assembly 210. The transmission belt 215 can be a transmission chain, and also can be a transmission belt.

Figure 3:
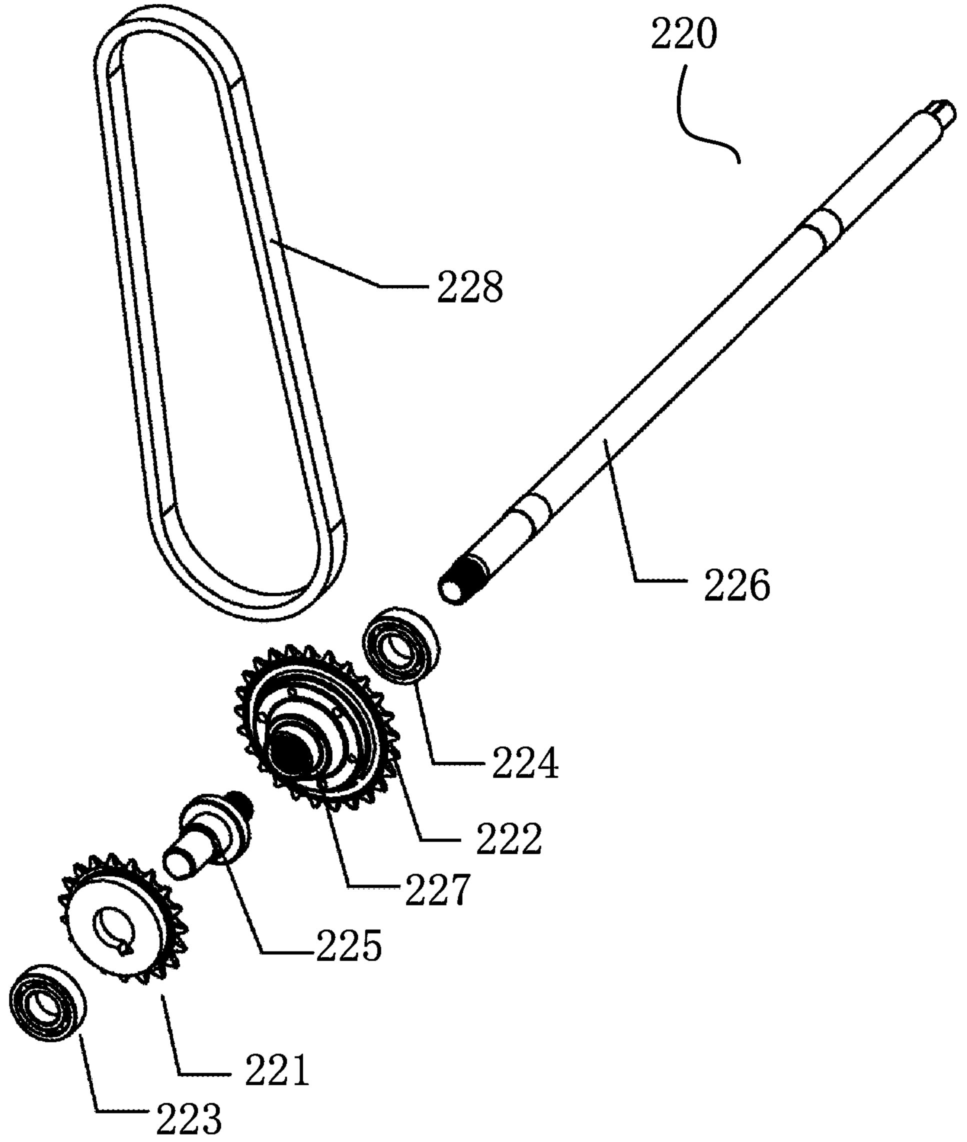
FIG. 3 is an exploded diagram of a transmission assembly of the unpowered multi joint synchronous training device in FIG. 1.

Referring to FIG. 3, FIG. 3 is an exploded diagram of the transmission assembly 220 of the transmission mechanism 200. The transmission assembly 220 comprises chain wheels 221 and 222, bearings 223 and 224, and a mounting shaft 225. The chain wheels 221 and 222 are connected to each other by a bearing assembly consisting of the bearings 223 and 224 and the mounting shaft 225, such that the chain wheels 221 and 222 can rotate synchronously. In the transmission assembly 220, the chain wheel 221 receives the driving force (or the twisting force) delivered by the wheel assembly 210 via the transmission belt 215 described above, and the chain wheel 222 is in driving connection with the drive assembly 230 of the transmission mechanism 200 via another transmission belt 228, thereby further delivering the driving force (the twisting force) to the drive assembly 230. Similarly with the transmission belt 215, the transmission belt 228 can be a transmission chain, and also can be a transmission belt. In some embodiments, the mounting shaft 225 is preferably a splined shaft.

Returning to FIG. 1, the body frame 100 shown in FIG. 1 is attached with a pair of transmission mechanisms 200. Accordingly, the training device 10 shown in FIG. 1 has a pair of transmitting mechanisms 200. In the embodiments of the invention, the pair of transmission mechanisms 200 is connected to each other through a shaft lever 226. As is shown in FIG. 2, one end of the shaft lever 226 is connected to the mounting shaft 225 of one transmission assembly 200, and the other end of the shaft lever 226 is also connected to the mounting shaft of another transmission assembly (not shown). Accordingly, driving forces of the two transmission assemblies can be complementary. In other embodiments combinable with some embodiments of the invention, the transmission assembly 220 comprises a differential mechanism 227. As shown in FIG. 2, a radial outer side of the differential mechanism 227 is welded to the chain wheel 222. Of course, the differential mechanism 227 also can be mounted at other positions of the transmission assembly 220. As for a pair of transmitting assemblies in the training device 10, the differential mechanism shall be only mounted onto one transmission assembly. For example, the differential mechanism 227 is mounted onto the transmission assembly 220 shown in FIG. 2, but also can be mounted onto another transmission assembly not shown in FIG. 2. Use of the differential mechanism avoids the phenomenon of self-steering caused by uneven road surface or inconsistent rotational speeds of the pair of wheel assemblies 210 when making a turn, while not increasing additional resistance to steering of the wheels.

Figure 4:
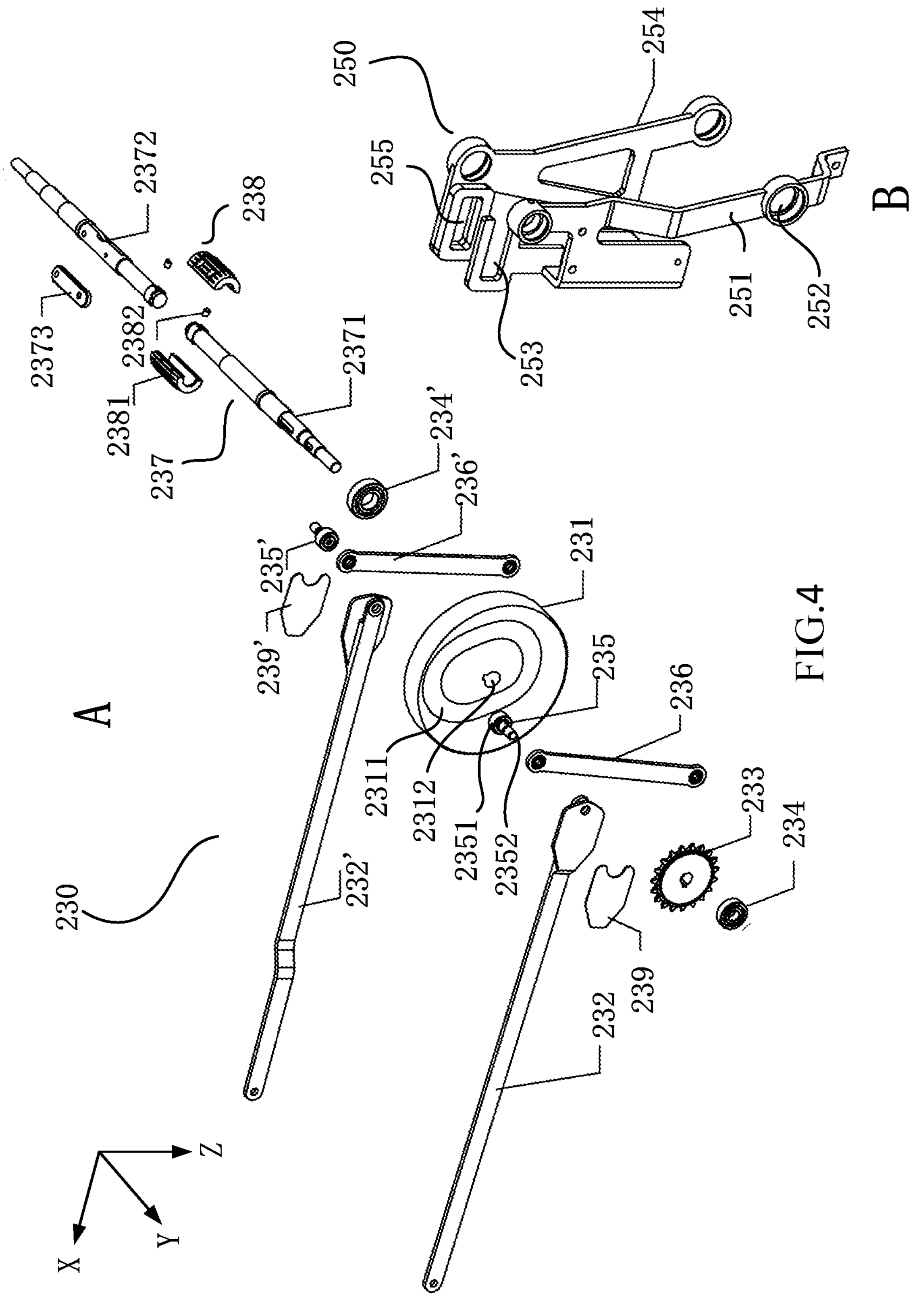
FIG. 4 is an exploded diagram of a cam assembly and a cam support of the unpowered multi joint synchronous training device in FIG. 1.

Please continue to refer to FIG. 4, a portion A in FIG. 4 is an exploded diagram of a can mechanism 230 of the transmission mechanism 200, and a portion B in FIG. 4 is a schematic diagram of a cam support 250.

As shown in FIG. 4, the drive assembly 230 comprises a cam 231, a connecting rod 232, a chain wheel 233, a bearing 234, a follow-up roller 235, an oscillating rod 236 and a shaft lever 237. The shaft lever 237 connects the chain wheel 233 and the cam 231 to each other via an opening 2312 formed in a center of the cam 231 by virtue of the bearing 234. The chain wheel 233 receives a driving force (a twisting force) provided by the transmission assembly 220 via the transmission belt 228 described above, such that the cam 231 rotates along with rotation of the transmission assembly 220.

A cam slot 2311 described below is form on one side of the cam 231. The connecting rod 232 has one end connected to the cam 231, and the other end connected to a leg rod assembly 240 explicitly described below, such that when the cam 231 rotates, one end of the connecting rod 232 connected to the cam 231 performs reciprocating motion in a substantially horizontal direction along with rotation of the cam 231, and the other end of the connecting rod 232 connected to the leg rod assembly 240 oscillates back and forth under driving of the cam 231. In such way, the leg rod assembly 240 drives the leg of the patient to passively oscillate back and forth in a walking gait of a normal person, such that the patient passively walks forward, thereby realizing the object of walk rehabilitation training.

Specifically, the follow-up roller 235 is disposed in the cam slot 2311, and a cam contour of the cam slot 2311 is configured such that rotational movement of the cam 231 is converted into a predetermined reciprocation motion in a substantially horizontal direction of the follow-up roller 235 provided in the cam slot 2311. Preferably, the follow-up roller 235 is a roller bearing. Specifically, the follow-up roller has a rolling portion 2351 and a post 2352 connected to the rolling portion, and the rolling portion 2351 is disposed in the cam slot 2311, and has a side wall in contact with a side wall of the cam slot 2311, such that when the cam 231 rotates, the rolling portion 2351 of the follow-up roller 235 can roll in the cam slot 2311 along the side wall of the slot.

Referring to FIGS. 10A to 10D, they illustrate brief schematic diagrams of a cam 700 driving motion of a follow-up roller 750 according to one embodiment of the invention. The cam 700 is similar with the cam 231 in FIG. 4, and the follow-up roller 750 is similar with the follow-up roller 235 in FIG. 4.

Figure 10A:
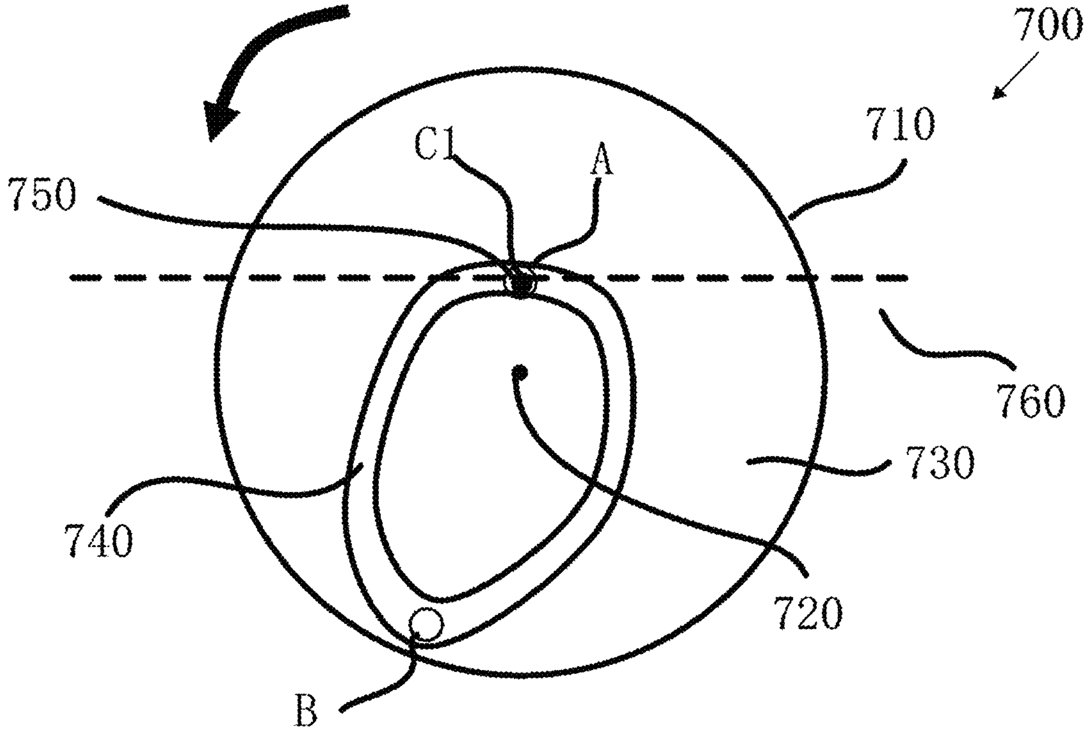
FIGS. 10A-10D illustrate brief schematic diagrams of a cam driving motion of a follow-up roller according to one embodiment of the invention.

As shown in FIG. 10A, the cam 700 has a circular main body 710, and can rotate with a center 720 as an axis under driving of the transmission assembly 220, preferably, rotating at a constant speed. A cam slot 740 is formed on a side surface 730 of the circular main body 710. For example, in some embodiments, the cam slot 740 is disposed eccentrically relative to the center 720. A cam contour of the cam slot 740 is a non-circular closed curve, and a position A of the cam contour is closest to the center, so it may be referred to as a proximal position A, and a position B of the cam contour is farthest from the center, so it may be referred to as a distal position B. The follow-up roller 750 is disposed in the cam slot 740, and the follow-up roller 750 is substantially movable only on a horizontal axis 760 due to limit of the oscillating rod 236 and the cam support 250 described below in FIG. 4.

For example, the position of the follow-up roller 750 along the horizontal axis 760 in FIG. 10A serves as an initial position C1 at a time T0. As shown in FIG. 10A, at the position C1, the cam 700 rotates such that the proximal position A of the cam slot 740 thereon is just along the horizontal axis 760, such that the follow-up roller 750 in the cam slot 740 is at the proximal position A of the cam contour.

Figure 10B:
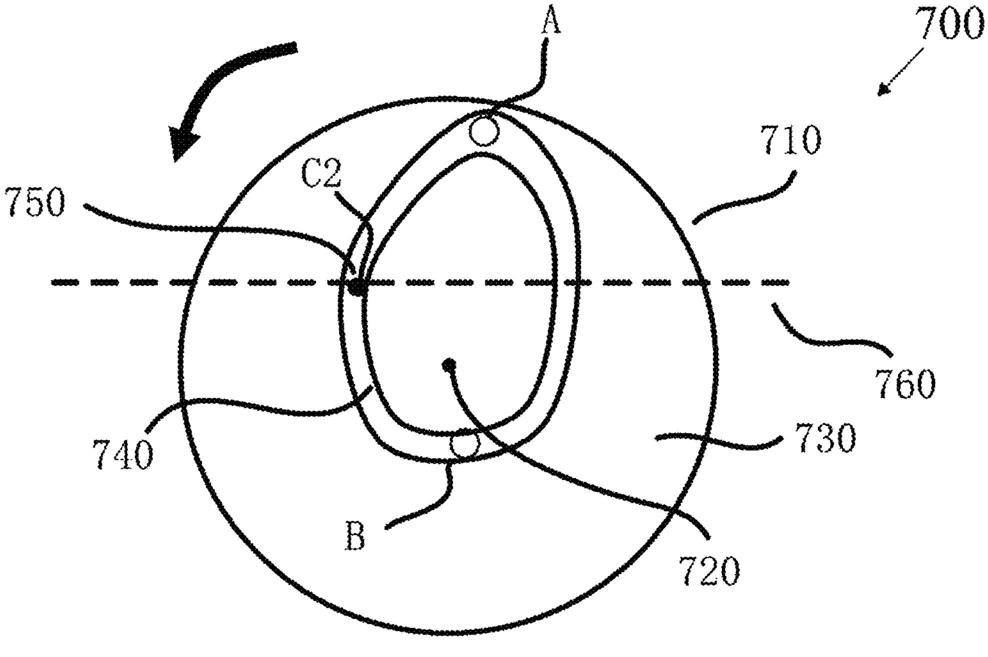

Next, the cam 700 rotates anticlockwise along a direction of an arrow shown in FIG. 10A, such that the cam 700 is rotated to a state in FIG. 10B. As shown in FIG. 10B, at a time T1, as the cam 700 rotates, one position between the proximal position A and the distal position B of the cam contour is rotated to coincide with the horizontal axis 760. At this time, a side wall of the cam slot 740 urges the follow-up roller 750 to move from the position C1 in FIG. 10A to a position C2 along the horizontal axis 760 in FIG. 10B along a horizontal direction (e.g., horizontal left) of the horizontal axis 760.

Figure 10C:
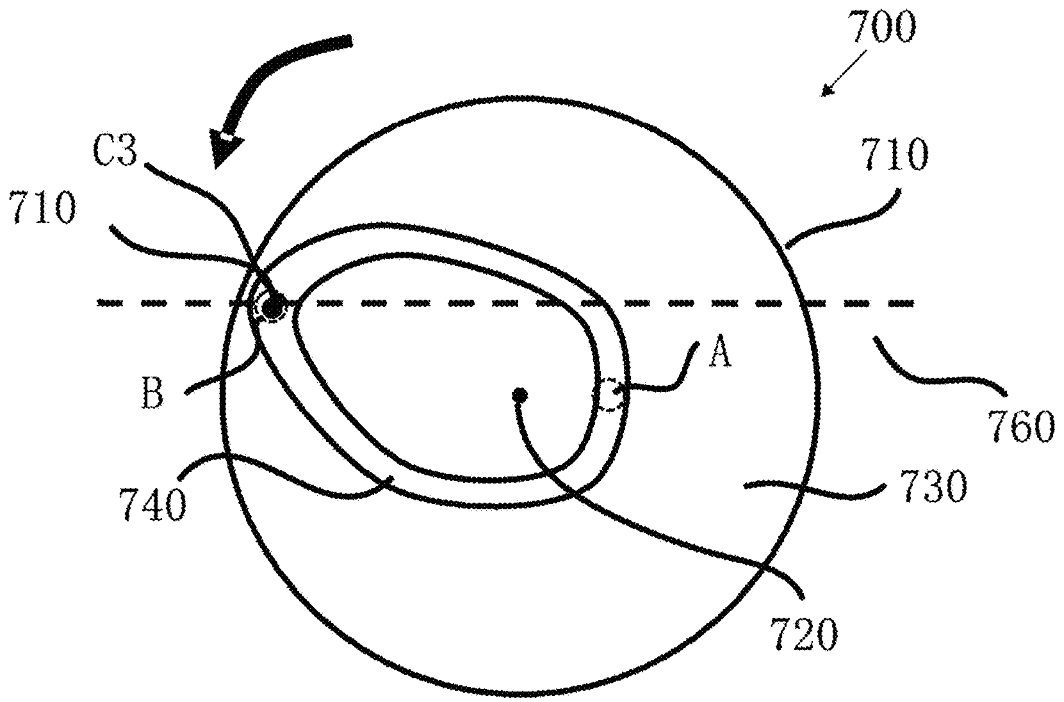

Next, the cam 700 continues to rotate anticlockwise along a direction of an arrow shown in FIG. 10B, such that the cam 700 is rotated to a state in FIG. 10C. As shown in FIG. 10C, at a time T2, as the cam 700 rotates, the distal position B of the cam contour is rotated to coincide with the horizontal axis 760. At this time, the side wall of the cam slot 740 urges the follow-up roller 750 to move from the position C2 in FIG. 10B to a position C3 in FIG. 10C along the horizontal direction (e.g., horizontal left) of the horizontal axis 760. At the position C3, the follow-up roller 750 is just at the distal position B of the cam contour.

Figure 10D:
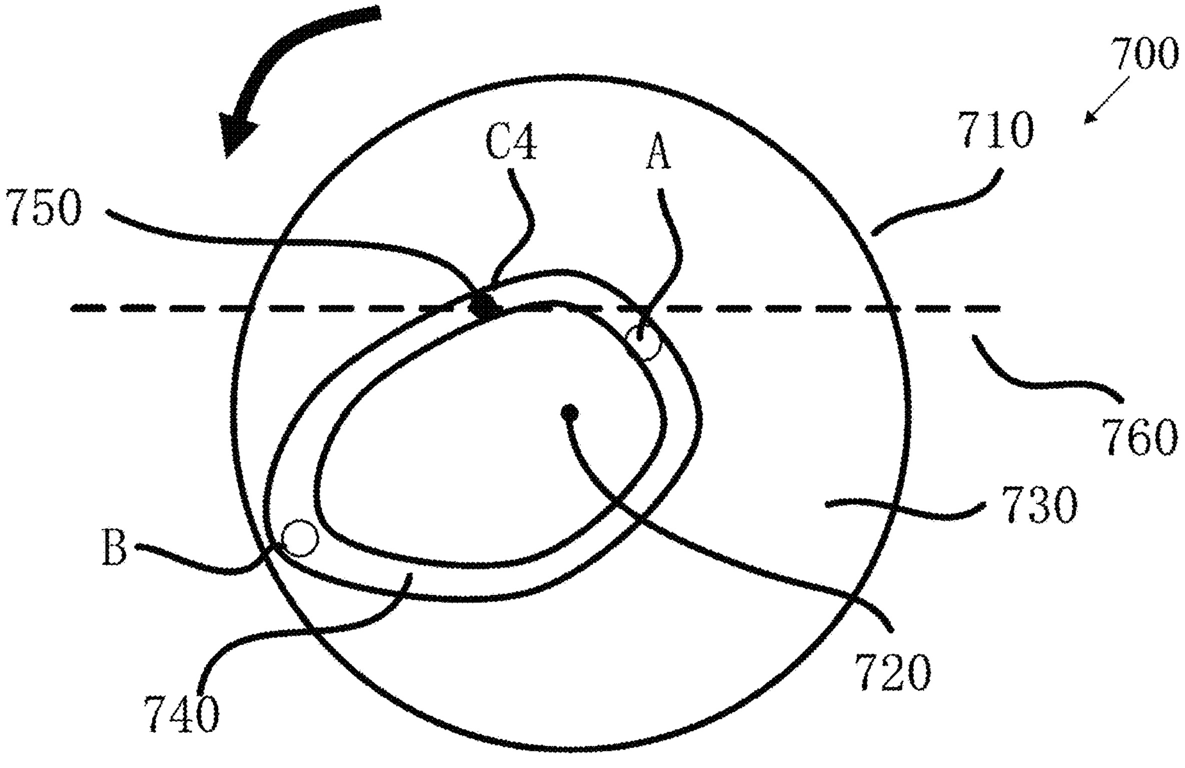

Next, the cam 700 continues to rotate anticlockwise along a direction of an arrow shown in FIG. 10C, such that the cam 700 is rotated to a state in FIG. 10D. As shown in FIG. 10D, at a time T3, as the cam 700 rotates, one position between the proximal position A and the distal position B of the cam contour is rotated to coincide with the horizontal axis 760. At this time, the side wall of the cam slot 740 urges the follow-up roller 750 to move reversely from the position C3 in FIG. 10C to a position C4 along the horizontal axis 760 in FIG. 10D in an opposite direction (e.g., horizontal right) to that in FIGS. 10A and 10B along the horizontal direction of the horizontal axis 760.

Next, if the cam 700 continues to rotate anticlockwise along a direction of an arrow shown in FIG. 10D, it returns to a state shown in FIG. 10A. That is, the proximal position A of the cam slot 740 is just along the horizontal axis 760. At this time, the side wall of the cam slot 740 urges the follow-up roller 750 to move from the position C4 in FIG. 10D to return to the position C1 in FIG. 10A in the opposite direction (e.g., horizontal right) along the horizontal direction of the horizontal axis 760.

As can be seen, during one rotation of the cam 700, the follow-up roller 750 performs reciprocating motion along the horizontal axis 760. As shown in FIGS. 10A to 10D, during one rotation of the cam 700, the follow-up roller moves horizontally left from the initial position C1 at the time T0 to the position C2 at the time T1, then continues to move horizontally left to the position C3 at the time T2, next moves horizontally right in the opposite direction to the position C4, and finally continues to return horizontally right in the opposite direction to the position C1. Accordingly, during one rotation of the cam 700, the follow-up roller 750 experiences reciprocating motion from the position C1, to the position C2, the position C3, the position C4 and the position C1. The positions C1 and C3 correspond to turning points of the reciprocating motion, the position C1 corresponds to a position where the proximal position A of the cam contour is rotated to coincide with the horizontal axis 760, and the position C3 corresponds to a position where the distal position B of the cam contour is rotated to coincide with the horizontal axis 760. Therefore, during one rotation of the cam 700, the follow-up roller 750 performs reciprocating motion once between the positions C1 and C3. Meanwhile, the cam contour of the non-circular closed curve also causes that an instantaneous speed of movement of the follow-up roller 750 along the horizontal axis 760 changes as the cam contour changes during rotation of the cam 700. In other words, during rotation of the cam 700, the follow-up roller 750 performs variable-speed reciprocating motion between the positions C1 and C3. The variable-speed reciprocating motion between the positions C1 and C3 further drives variable-speed oscillation of a driven object (not shown) driven by the follow-up roller 750 within a predetermined angular range.

Using the cam as the drive assembly 230 is described above such that rotational movement of the cam drives the follow-up roller provided in the cam slot to perform reciprocation motion, and then other driving forms also can be used. FIGS. 11A to 11D illustrate replacing the cam 700 having the cam slot 740 with a non-circular gear pair 800. In the case of using the non-circular gear pair 800, the chain wheel 233 of the drive assembly 230 is connected to a driving non-circular gear 810 in the non-circular gear pair 800, not connecting the chain wheel 233 to the cam 700.

FIGS. 11A to 11D illustrate brief schematic diagrams of using the non-circular gear pair 800 to drive motion of a follower 850 thereon.

As shown in FIGS. 11A to 11D, the non-circular gear pair 800 has a driving non-circular gear 810 and a driven non-circular gear 820 engaged therewith. The driving non-circular gear 810 drives the driven non-circular gear 820 to rotate. The driving non-circular gear 810 and the driven non-circular gear 820 form teeth on a periphery, and have the same number of teeth, such that for each rotation of the driving non-circular gear 810, the driven non-circular gear 820 also rotates once. In this embodiment, axes of rotation 830 and 840 of the driving non-circular gear 810 and the driven non-circular gear 820 deviate from geometric centers, and are designed such that a center distance between the driving non-circular gear 810 and the driven non-circular gear 820 is equal. The center distance refers to a sum of a rotation radius from the axis of rotation 830 of the driving non-circular gear 810 to an engaged position and a rotation radius from the axis of rotation 840 of the driven non-circular gear 820 to the engaged position. Accordingly, the non-circular gear pair 800 having the same center distance ensures that the driving non-circular gear 810 and the driven non-circular gear 820 can be engaged together when the driving non-circular gear 810 and the driven non-circular gear 820 rotate to any position without separation or extrusion from each other. The follower 850 is formed on a side surface of the driven non-circular gear 820.

Hereinafter motion of the follower 850 on the non-circular gear pair 800 is described with reference to FIGS. 11A to 11D.

Figure 11A:
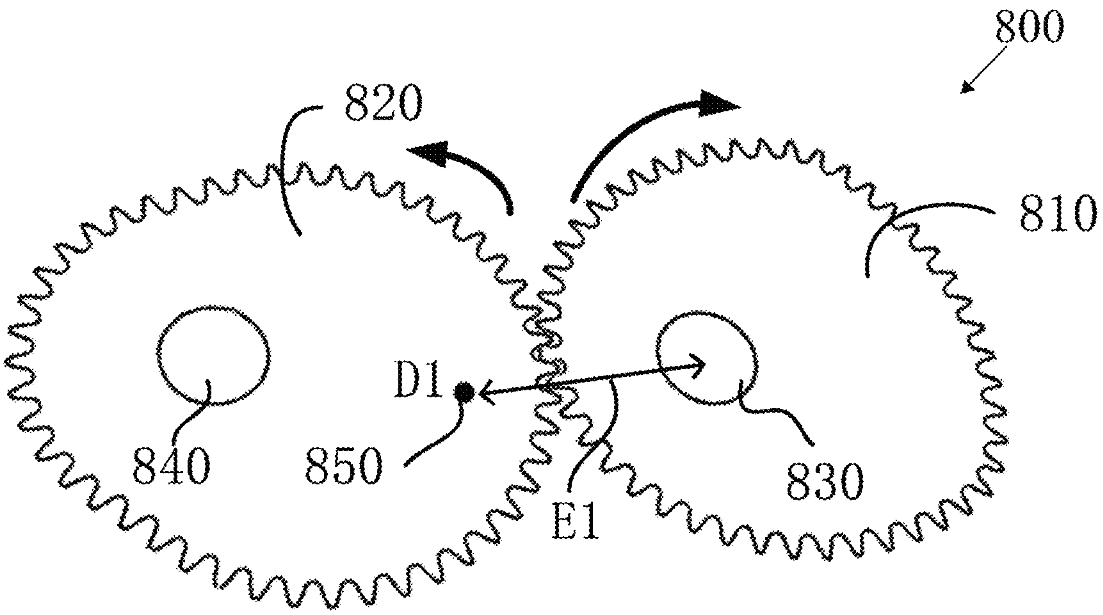
FIGS. 11A-11D illustrate brief schematic diagrams of a non-circular gear pair driving motion of a follower according to another embodiment of the invention.

As shown in FIG. 11A, the position of the follower 850 in FIG. 11A serves as an initial position D1 at a time T0. As shown in FIG. 11A, at the position D1, a distance E1 between the follower 850 and the axis of rotation 830 of the driving non-circular gear 810 is shortest, i.e., at the position D1, the follower is closest to the axis of rotation 830 of the driving non-circular gear 810.

Figure 11B:
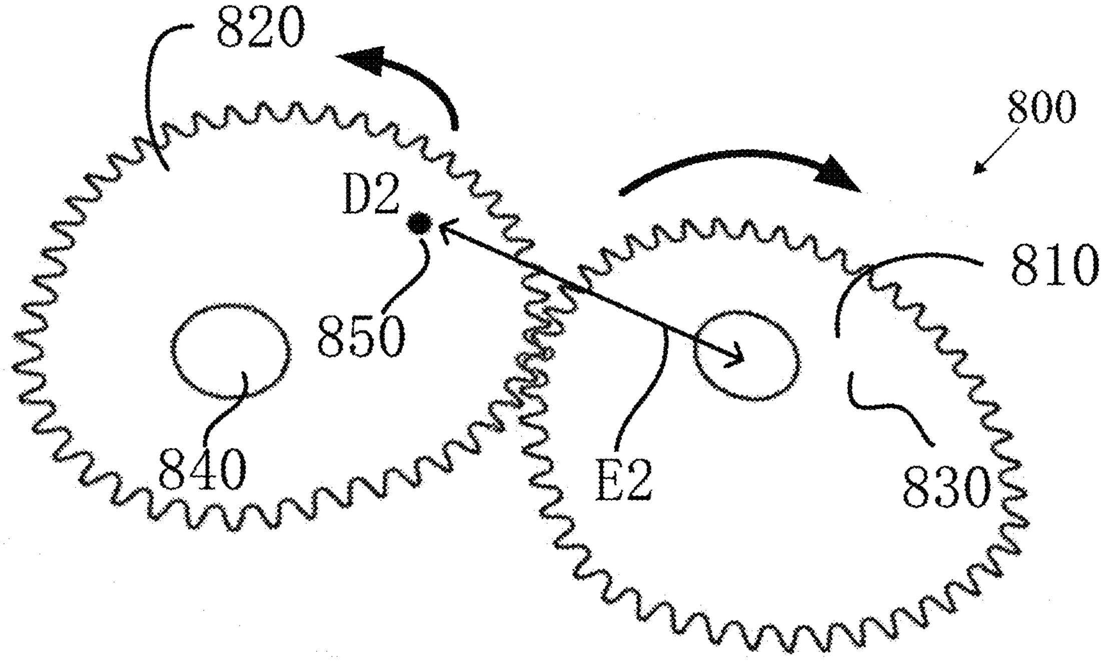

Next, the driving non-circular gear 810 rotates clockwise along a direction of an arrow shown in FIG. 11A, such that the driven non-circular gear 820 rotates anticlockwise under driving of the driving non-circular gear 810, and the non-circular gear pair 800 is rotated to a state in FIG. 11B. As shown in FIG. 11B, at a time T1, as the non-circular gear pair 800 rotates, the follower 850 at the position D1 closest to the axis of rotation 830 of the driving non-circular gear 810 moves to a position D2. At the position D2, a distance E2 between the follower 850 and the axis of rotation 830 of the driving non-circular gear 810 is greater than E1, so as the non-circular gear pair 800 moves from a state in FIG. 11A to the state in FIG. 11B, the follower 850 gradually gets away from the axis of rotation 830 of the driving non-circular gear 810.

Figure 11C:
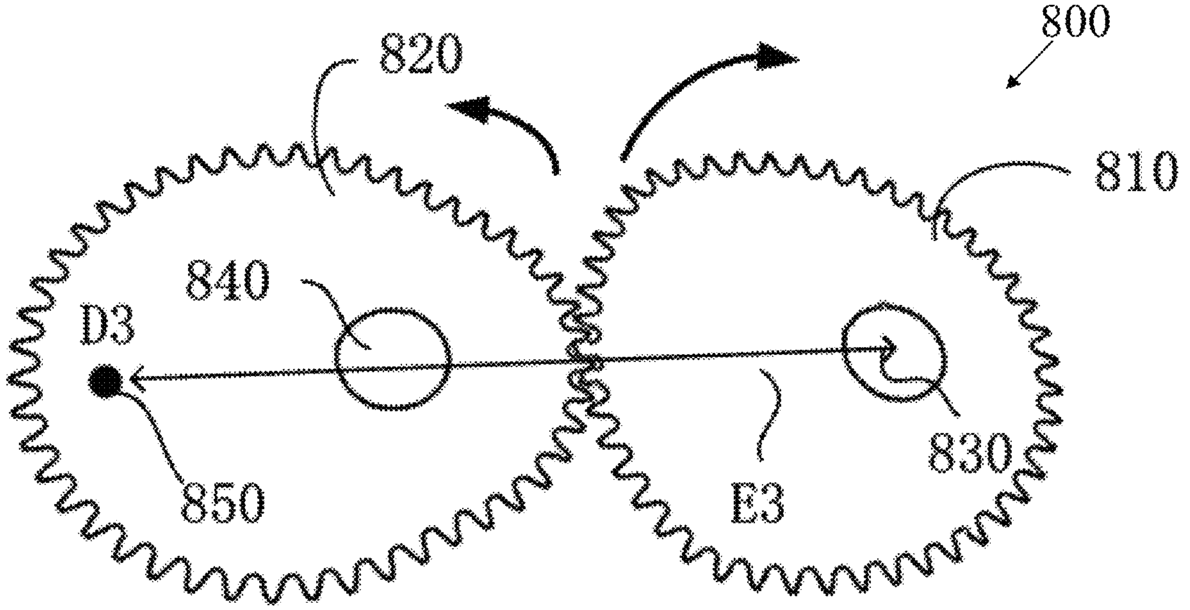

Next, the driving non-circular gear 810 continues to rotate clockwise along a direction of an arrow shown in FIG. 11B, such that the driven non-circular gear 820 rotates anticlockwise under driving of the driving non-circular gear 810, and the non-circular gear pair 800 is rotated to a state in FIG. 11C. As shown in FIG. 11C, at a time T2, as the non-circular gear pair 800 rotates, the follower 850 at the position D2 moves to a position D3. At the position D3, a distance E3 between the follower 850 and the axis of rotation 830 of the driving non-circular gear 810 is further greater than E2, so as the non-circular gear pair 800 moves from the state in FIG. 11B to the state in FIG. 11C, the follower 850 continues to gradually get away from the axis of rotation 830 of the driving non-circular gear 810.

Figure 11D:
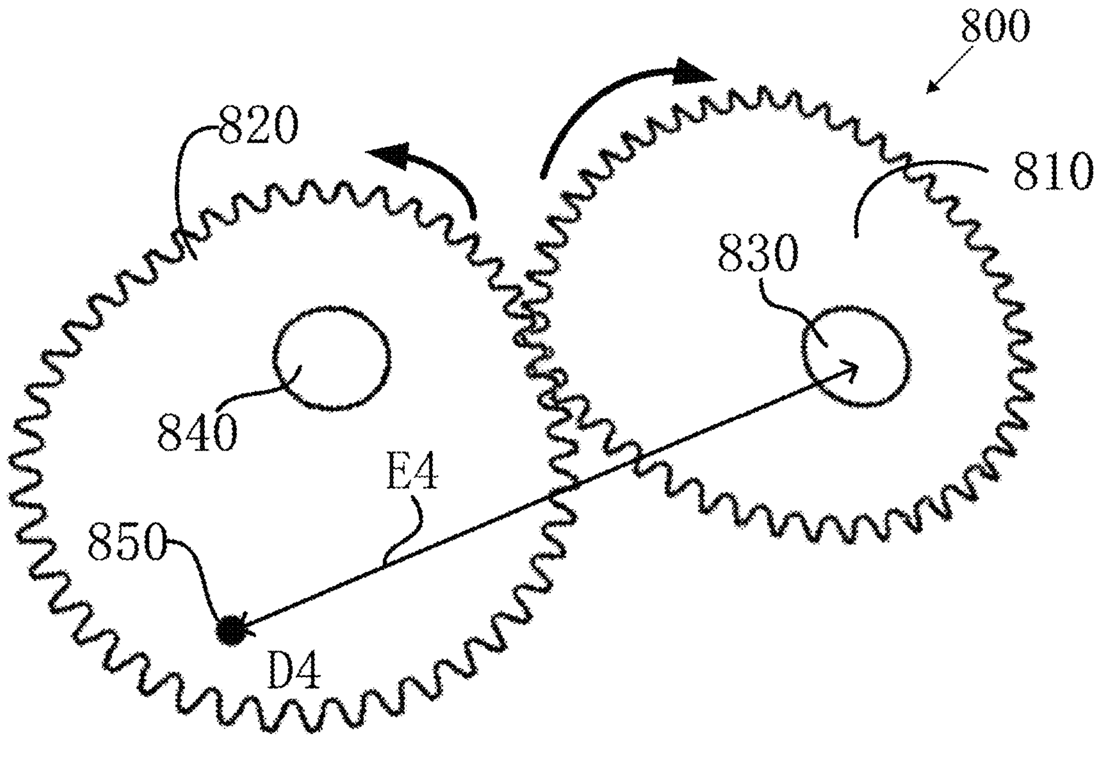

Next, the driving non-circular gear 810 continues to rotate clockwise along a direction of an arrow shown in FIG. 11C, such that the driven non-circular gear 820 rotates anticlockwise under driving of the driving non-circular gear 810, and the non-circular gear pair 800 is rotated to a state in FIG. 11D. As shown in FIG. 11D, at a time T3, as the non-circular gear pair 800 rotates, the follower 850 at the position D3 moves to a position D4. At the position D4, a distance E4 between the follower 850 and the axis of rotation 830 of the driving non-circular gear 810 is less than E3 and greater than E1, so as the non-circular gear pair 800 moves from the state in FIG. 11C to the state in FIG. 11D, the follower 850 begins to gradually get close to the axis of rotation 830 of the driving non-circular gear 810.

Next, if the driving non-circular gear 810 continues to rotate clockwise along a direction of an arrow shown in FIG. 11D, the driven non-circular gear 820 rotates anticlockwise under driving of the driving non-circular gear 810, and returns to the state in FIG. 11A. That is, as the non-circular gear pair 800 moves from the state in FIG. 11D to the state in FIG. 11A, the follower 850 continues to gradually get close to the axis of rotation 830 of the driving non-circular gear 810, and finally returns to the position D1 closest to the axis of rotation 830 of the driving non-circular gear 810. At this time, the cam 700 just rotates once.

As can be seen, during one rotation of the non-circular gear pair 800, the follower 850 performs reciprocating motion between the positions D1 and D3. As shown in FIGS. 11A to 11D, during one rotation of the non-circular gear pair 800, the follower 850 moves from the initial position D1 closest to the axis of rotation 830 of the driving non-circular gear 810 at the time T0 to the position D2 away from the axis of rotation 830 of the driving non-circular gear 810, then further gets away from the axis of rotation 830 of the driving non-circular gear 810 at the time T2 and moves to the position D3 farthest from the axis of rotation 830, next gradually gets close to the axis of rotation 830 and moves to the position D3, and finally further gets close to the axis of rotation 830 and returns to the position D1 closest to the axis of rotation 830. Accordingly, during one rotation of the non-circular gear pair 800, the follower 850 experiences reciprocating motion from the position D1, to the position D2, the position D3, the position D4 and the position D1. The positions D1 and D3 correspond to turning points of the reciprocating motion, the position D1 corresponds to a position closest to the axis of rotation 830 of the driving non-circular gear 810, and the position D3 corresponds to a position farthest from the axis of rotation 830 of the driving non-circular gear 810. Therefore, during one rotation of the non-circular gear pair 800, the follower 850 performs reciprocating motion once between the positions D1 and D3. Meanwhile, the non-circular gear contour also causes that an instantaneous speed of the follower 850 at each position changes as a pitch line of the non-circular gear changes during rotation of the non-circular gear pair 800. In other words, during rotation of the non-circular gear pair 800, the follower 850 performs variable-speed reciprocating motion between the positions D1 and D3. The variable-speed reciprocating motion between the positions D1 and D3 further drives variable-speed oscillation of a driven object (not shown) driven by the follower 850 within a predetermined angular range.

Returning to FIG. 4, in one preferable embodiment, the variable-speed reciprocating motion obtained from design of the cam contour of the cam slot 2311 drives variable-speed oscillation of one point of the leg with hip as an axis when a normal person walks. Accordingly, as the follow-up roller 235 rolls in the cam slot 2311, the follow-up roller 235 changes at a position in an X-Z plane based on the cam contour of the cam slot 2311, i.e., performing regular variable-speed reciprocating motion between the positions C1 and C3 in FIGS. 10A to 10D on the X-Z plane according to the cam contour of the cam slot 2311. The two boundary positions C1 and C3 of reciprocating motion of the follow-up roller 235 correspond to two boundary angles of one point of the leg with hip as an axis when the normal person walks. The post 2352 of the follow-up roller 235 is connected to one end of the connecting rod 232, and the other end of the connecting rod 232 is connected to the leg rod assembly 240 described below, such that when the follow-up roller 235 performs regular variable-speed reciprocating motion in the X-Z plane along with rotation of the cam 231, the leg rod assembly 240 performs regular variable-speed oscillation in the X-Z plane under action of pushing or pulling of the connecting rod 232. When the cam contour of the cam slot 2311 of the cam 231 rotates once, the follow-up roller 235 in the cam slot 2311 performs reciprocating motion once on a distance defined by the positions C1 and C3 in FIGS. 10A to 10D, for example. Since the follow-up roller 235 drives the leg rod assembly 240 to oscillate, the leg rod assembly 240 also oscillates correspondingly under driving of the reciprocating motion. An oscillation angle of the leg rod assembly 240 driven by the reciprocating motion corresponds to oscillation of one point of the leg taking one step relative to the hip when the normal person walks, and the variable-speed oscillation of the leg rod assembly 240 driven by one reciprocating motion of the follow-up roller 235 corresponds to variable-speed oscillation of one point of the leg taking one step relative to the hip when the normal person walks, such that the patient fixed onto the leg rod assembly 240 passively takes one step, and the oscillation angle and the oscillation way of the leg when the patient takes one step are the same as the normal person, thereby realizing walk training of the patient. In the embodiments of the invention, specifically, the connecting rod 232 connects the follow-up roller 235 to a position of the leg rod assembly 240 corresponding to thigh and close to the hip, so the reciprocating motion corresponding to the design of the cam contour of the cam slot 2311 drives oscillation of the thigh relative to the hip when the normal person walks, and the oscillation angle driven by the reciprocating motion corresponds to an oscillation angle of the thigh relative to the hip when the normal person walks.

As for walking gait of the normal person, a thigh position close to the hip of the normal person substantially oscillates back and forth in a direction X shown in FIG. 4, and oscillates slightly, or does not oscillate in a direction Z. Considering of it, the training device is further provided with a cam support 250. The cam support 250 has a first arm 251, and a bottom and a top of the first arm 251 have fixing sleeves 252 for supporting and fixing the bearing 234 of the drive assembly 230 and the bearing 223 of the transmission assembly 220 therein. A guiding slot 253 is further formed on an upper portion of the first arm 251, and formed to be an elongated hole extending in the direction X. The post 2352 of the follow-up roller 235 is disposed in the guiding slot 253, such that when the follow-up roller 235 performs regular oscillation in the X-Z plane, displacement in the direction Z (i.e., a vertical direction) is limited by the guiding slot 253, and the follow-up roller 235 only performs regular oscillation back and forth in the substantially direction X (i.e., a horizontal direction). Moreover, the drive assembly 240 further has the oscillating rod 236 having one end connected to the post 2352, and the other end connected to the cam support 250, such that displacement of the follow-up roller 235 in the direction Z also can be limited by the oscillating rod 236. The other end of the oscillating rod 236 also can be directly connected to the body frame 100.

In other embodiments combinable with the embodiments of the invention, a second cam slot (not shown) is further formed on the other side of the cam 231 opposite to one side formed with the cam slot 2311, and similar with the cam slot 2311, the variable-speed reciprocation motion corresponding to design of a cam contour of the second cam slot is another variable-speed reciprocation motion different from the variable-speed reciprocation motion corresponding to the cam contour of the cam slot 2311. Correspondingly, the drive assembly 230 further has a second bearing 234', a second connecting rod 232', a second follow-up roller 235' and a second oscillating rod 236'. The second bearing 234' is configured to connect the cam 231 and the shaft lever 234. A mating way of the second cam slot, the second connecting rod 232', the second follow-up roller 235' and the second oscillating rod 236' is substantially the same as that of the cam slot 2311, the connecting rod 232, the follow-up roller 235 and the oscillating rod 236, so the details are not described here. Correspondingly, the cam support 250 may further have a second arm 254 parallel to the first arm 251. A bottom and a top of the second arm 254 also have fixing sleeves 252 for supporting and fixing the second bearing 234' of the drive assembly 230 and the bearing 224 of the transmission assembly 220 therein. Moreover, a second guiding slot 255 is also formed on an upper portion of the second arm 254 for limiting displacement of the second follow-up roller 235' in the direction Z, such that the second cam slot is configured to convert rotational movement of the cam 231 into reciprocation motion of the second follow-up roller 235' provided in the second cam slot in the substantially direction X (the horizontal direction).

In the embodiment where the cam 231 has the second cam slot, the second connecting rod 252' has one end connected to the second follow-up roller 235', and the other end directly or indirectly connected to a position of the leg rod assembly 240 corresponding to a knee. Therefore, the variable-speed reciprocation motion corresponding to the design of the cam contour of the second cam slot corresponds to variable-speed oscillation of the lower leg relative to the hip when the normal person walks, and the two boundary positions of the reciprocation motion correspond to two boundary angles of variable-speed oscillation of the lower leg relative to the hip when the normal person walks. Accordingly, for each rotation of the cam 231, the variable-speed reciprocation motion of the second follow-up roller 235' in the second cam slot corresponds to variable-speed oscillation of the lower leg relative to the hip when the normal person walks, thereby driving the lower leg portion of the leg rod assembly 240 to also perform oscillation once in an oscillation way of the lower leg relative to the hip when the normal person walks. Therefore, the patient's lower leg also performs oscillation once in the corresponding oscillation way of the lower leg when the normal person walks, thereby realizing walk training of the patient.

In other embodiments combinable with the embodiments of the invention, the drive assembly 230 may have friction plates 239 and 239' (if present) between the cam support 250 and the connecting rod. Preferably, the friction plates 239 and 239' are PTFE-based friction plates, which may reduce frictional resistance of the connecting rod in the process of oscillation.

It shall be noticed that although walk training of the patient based on the drive assembly 230 having the cam is described above, another form of drive assembly having the non-circular gear pair 800 shown in FIGS. 11A to 11D also can be used to realize walk training of the patient. In such case, the connecting rod 232 connecting the thigh position of the leg rod assembly 240 and the follow-up roller 235 may be modified to connecting the thigh position of the leg rod assembly 240 and the follower 850, such that the variable-speed reciprocation motion of the follower 850 between the positions D1 and D3 also can drive the thigh of the patient to perform variable-speed oscillation in an oscillation way of the thigh relative to the hip when the normal person walks. Moreover, the drive assembly having the non-circular gear pair 800 may further have another additional non-circular gear pair, which is different from the non-circular gear pair 800, and designed such that the variable-speed reciprocation motion of the follower corresponds to variable-speed oscillation of the lower leg of the normal person relative to the hip. Therefore, in such case, the second connecting rod 232' connecting the lower leg position of the leg rod assembly 240 and the second follow-up roller 235' may be modified to connecting the lower leg position of the leg rod assembly 240 and the follower of the additional non-circular gear pair, such that the variable-speed reciprocation motion of the follower of the additional non-circular gear pair can drive the lower leg of the patient to perform variable-speed oscillation in an oscillation way of the lower leg relative to the hip when the normal person walks.

Since the body frame 100 is attached with a pair of transmission mechanisms 200, the training device 10 has a pair of driving assemblies 230. As shown in FIG. 4, one end of the shaft lever 237 is connected to one drive assembly 230, and although not shown, the other end of the shaft lever 237 is connected to another drive assembly, which is configured to the same as the drive assembly 230. In the walking gait of the normal person, phases of oscillation of the two legs always have a difference of 180°, so the pair of driving assemblies connected to the shaft lever 237 is also mounted with a phase difference of 180°.

In other embodiments combinable with the embodiments of the invention, the shaft lever 237 is formed by a first shaft lever 2371 connected to the drive assembly 230, and a second shaft lever 2372 connected to another drive assembly. Moreover, the first shaft lever 2371 and the second shaft lever 2372 are mounted with a clutch device 238. Advantage of using the clutch device 238 lies in that the phase difference between the pair of driving assemblies can be adjusted according to needs. For example, when the patient wears the training device 10, the two legs shall be in a closed gesture, so the clutch device 238 can be opened to freely adjust phases of the driving assemblies on both sides, and when the patient completes wearing, the phases of the driving assemblies on both sides are adjusted again to have a phase difference of 180°, and then the clutch device is closed again to form fixed connection between the first shaft lever 2371 and the second shaft lever 2372. In other embodiments combinable with the embodiments of the invention, the clutch device 238 comprises a slide fastener 2381, and has limit handgrips on both sides to limit orientation of the first shaft lever 2371 and the second shaft lever 2372. For example, when making adjustment, orientation of any one of the first shaft lever 2371 and the second shaft lever 2372 is limited, and another one of the first shaft lever 2371 and the second shaft lever 2372 is adjusted. After adjusting to the specified phase, the limit handgrip of the another is tightened, then the clutch device 238 is closed, and the limit handgrips on both sides are released, respectively. The shaft lever 237 is further provided with a folding handle 2373 and an accommodation space for accommodating the folding handle 2373, and when the orientation of the first shaft lever 2371 and the second shaft lever 2372 is adjusted, the folding handle 2373 may rotate out of the accommodation space 2372 to facilitate adjusting the orientation of the first shaft lever 2371 and the second shaft lever 2372, and rotate the folding handle 2373 into the accommodation space after adjustment. The clutch device 238 is engraved with marker lines on half shafts of both sides, and when the half shafts of both sides are adjusted to align the marker lines, the slide fastener slides, i.e., the first shaft lever 2371 and the second shaft lever 2372 on both sides may be fixed at phases with a distance of 180°. The clutch device further comprises an elastic collision bead 2382 to ensure that the slide fastener 2381 may stay at a specified position when having no operation.

Figure 5A:
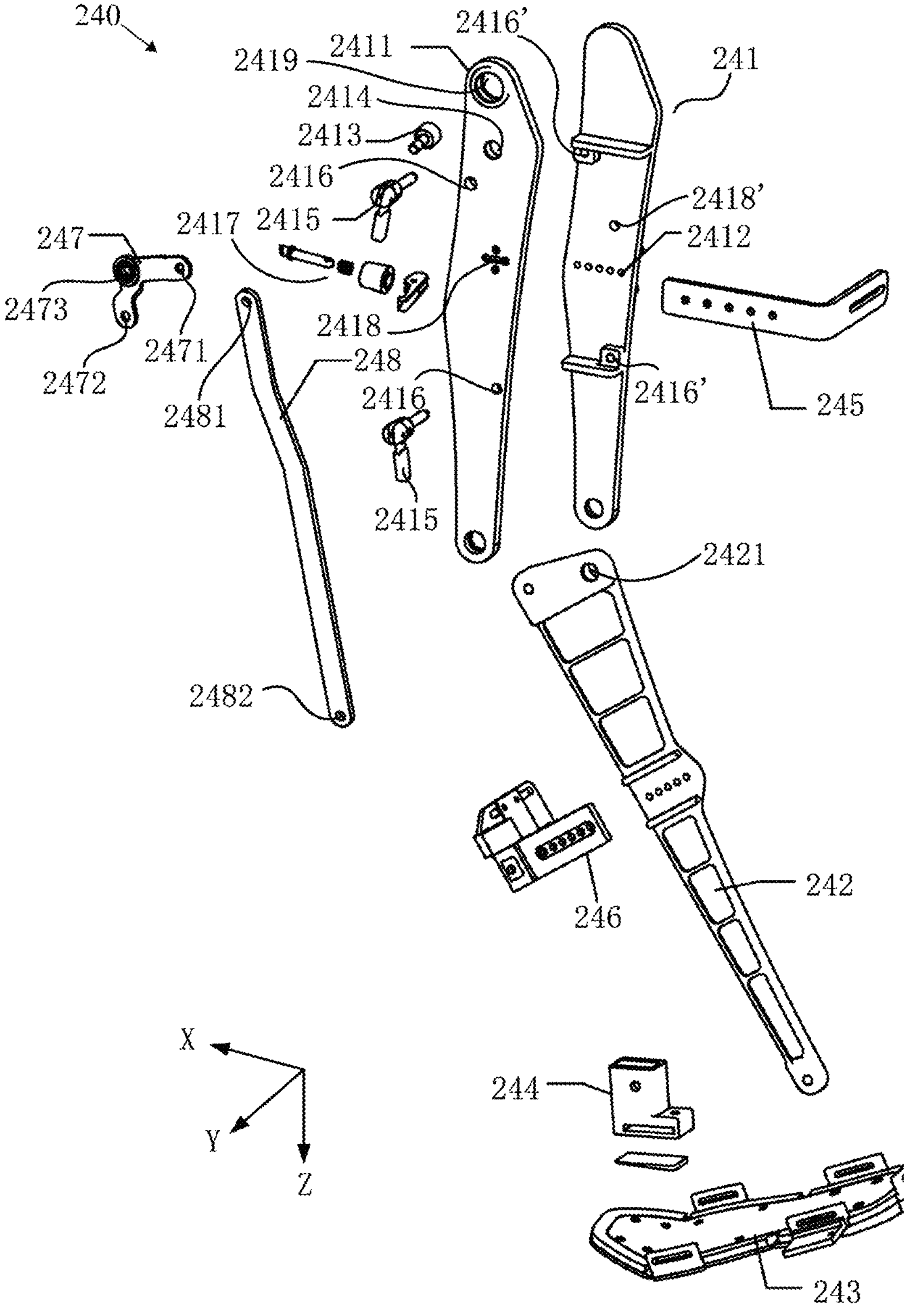
FIG. 5A is an exploded diagram of a leg rod assembly of the unpowered multi joint synchronous training device in FIG. 1.
Figure 5B:
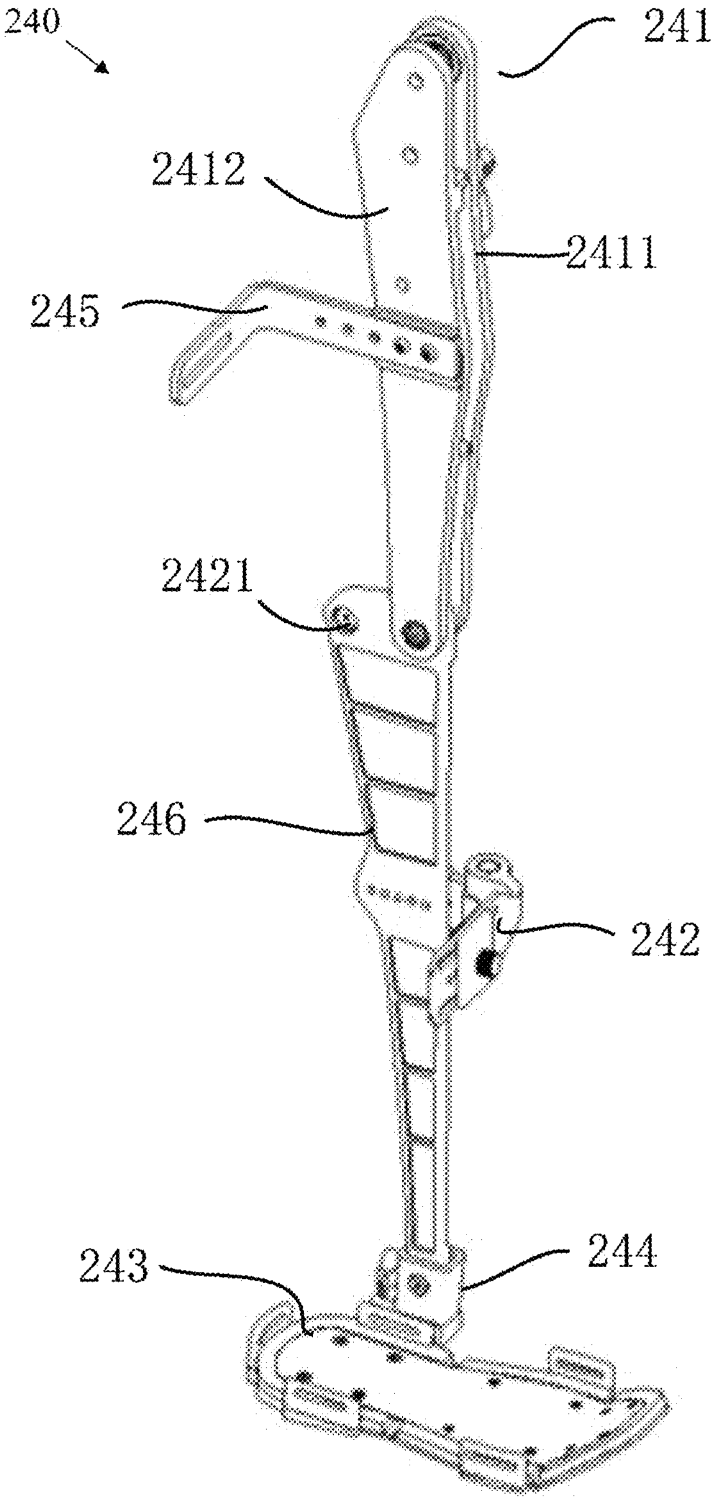
FIG. 5B is a perspective diagram of a leg rod assembly of the unpowered multi joint synchronous training device in FIG. 1.

Referring to FIGS. 5A and 5B, FIG. 5A is an exploded diagram of the leg rod assembly 240 of the transmission mechanism 200, and FIG. 5B is a perspective diagram of the leg rod assembly 240 of the transmission mechanism 200.

The leg rod assembly 240 is mainly formed of a thigh rod 241 and a lower leg rod 242. The thigh rod 241 and the lower leg rod 242 are connected to each other at a knee position through a bearing (not shown). In other embodiment combinable with the embodiments of the invention, the leg rod assembly 240 further comprises a plantar portion 243 detachably connected to the lower leg rod 242 of the leg rod assembly 240 at an ankle position of the leg rod assembly 240 through a foot connecting seat 244. The plantar portion 243 also may bent forward by 0 to 15 degrees.

In other embodiment combinable with the embodiments of the invention, the leg rod assembly 240 further comprises a bandage plate 245 attached to the thigh rod and a bandage seat 246 attached to the lower leg rod 242. The bandage plate 245 and the bandage seat 246 are mounted with leg bandages to fix the leg of the patient onto the leg rod assembly 240.

The thigh rod 241 has an opening 2419 at the hip, and a hole 2414 is formed at a position close to the hip. One end of the connecting rod 232 described above is connected to the hole 2414 through a roller bearing 2413, such that the thigh rod 241 performs regular oscillation along with rotation of the drive assembly 230, thereby realizing the object of walk rehabilitation training. In the embodiment with the second connecting rod 232' described above, the second connecting rod 232' is connected to a lower leg position of the lower leg rod 242 close to the knee, such that the lower leg portion of the leg rod assembly 240 also can perform regular oscillation along with rotation of the drive assembly 230. As shown in FIG. 1, the drive assembly 230 is mounted at a height substantially consistent with a hip position of the leg rod assembly 240, and in the walking gait of the normal person, oscillation of the lower leg is often in both the direction X (horizontal direction) and the direction Z (vertical direction). In order to convert oscillation of the knee to be at a height consistent with the drive assembly 230 as could as possible, in other embodiment combinable with the embodiments of the invention, preferably, one end of the second connecting rod 232' is indirectly connected to the hip position of the lower leg rod 242 close to the knee. As shown in FIG. 5, the second connecting rod 232' is indirectly connected to the lower leg position of the lower leg rod 242 close to the knee via a lower leg oscillating rod, and the lower leg oscillating rod is arranged at a position comprising the thigh rod 241 and corresponding to the hip, and is formed of a first follower rod 247 and a second follower rod 248. Specifically, one end of the second connecting rod 232' is connected to a hole at an end 2471 of the first follower rod 247 (e.g., through a bearing). For example, it is connected to a hole at an end 2481 of the second follower rod 248 at a hole of another end 2472 of the first follower rod 247 through a bearing. The second follower rod 248 is connected to a hole 2421 formed at a position close to the knee on a top of the lower leg rod 242 through a rolling bearing at a hole of another end 2482. The first follower rod 247 is connected to an opening 2419 formed at the hip of the thigh rod 241, for example, via a bearing, at an opening of a middle portion 2473. A position of the opening 2419 is proximate to the opening 2414. In such way, when the drive assembly 230 rotates, the second connecting rod 232' performs regular oscillation, and the second connecting rod 232' acts on the end 2471 of the first follower rod 247 to perform corresponding oscillation. When the first follower rod 247 takes the middle portion 2473 as an axis of rotation, another end 2472 of the first follower rod 247 oscillates along with the end 2471, and oscillation of another end 2472 of the first follower rod 247 is delivered to a position of the lower leg rod 242 close to the knee via the second follower rod 248, thereby driving the knee of the patient to perform corresponding oscillation. Preferably, the first follower rod 247 has an L shape. The first follower rod 247 and the second follower rod 248 bend at a predetermined position along a direction Y, such that the second connecting rod 232', the first follower rod 247 and the second follower rod 248 are staggered from one another in the direction Y, thereby avoiding interference of the second connecting rod 232', the first follower rod 247 and the second follower rod 248 when performing oscillation.

In other embodiments combinable with the embodiments of the invention, the thigh rod 241 comprises an outer thigh rod 2411 away from the thigh of the patient and an inner thigh rod 2412 closer to the thigh of the patient. The outer thigh rod 2411 and the inner thigh rod 2412 are detachably mounted together. As shown in FIG. 5, the outer thigh rod 2411 and the inner thigh rod 2412 are connected together to the lower leg rod 242 at bottoms through a bearing, such that when separating from each other, the outer thigh rod 2411 and the inner thigh rod 2412 can rotate with a connecting position of the outer thigh rod 2411 (and the inner thigh rod 2412) and the lower leg rod 242 as an axis of rotation on the X-Z plane. In such way, advantage lies in that when the patient wears in a sitting posture, the outer thigh rod 2411 and the inner thigh rod 2412 may be separated, such that the inner thigh rod 2412 may be at an angle of about 90° from the lower leg rod 242 on the X-Z plane to facilitate wearing. After the patient completes wearing, the patient stands up by virtue of an external force, and when the outer thigh rod 2411 and the inner thigh rod 2412 tend to be parallel to and overlap each other, the outer thigh rod 2411 and the inner thigh rod 2412 are mounted together to a whole body, thereby completing wearing. In other embodiments combinable with the embodiments of the invention, the thigh rod 241 has a spring cotter mechanism 2417 mounted at an opening 2418 of the outer thigh rod 2411. When the outer thigh rod 2411 and the inner thigh rod 2412 shall be separated, an operator manually opens the spring cotter mechanism 2417. When the outer thigh rod 2411 and the inner thigh rod 2412 shall be reassembled, the outer thigh rod 2411 rotates relative to the inner thigh rod 2412, and when the outer thigh rod 2411 rotates to coincide with the inner thigh rod 2412, an opening 2418' formed on the outer thigh rod 2411 overlaps the opening 2418. At this time, a spring cotter in the spring cotter mechanism 2417 automatically springs into the opening 2418', thereby automatically locking the outer thigh rod 2411 and the inner thigh rod 2412. The thigh rod further has two handgrip screws 2415 mounted at corresponding positions of an opening 2416 of the outer thigh rod 2411 and an opening 2416' of the inner thigh rod 2412. When the outer thigh rod 2411 and the inner thigh rod 2412 shall be separated, the operator manually opens the handgrip screws 2415 to separate the outer thigh rod 2411 from the inner thigh rod 2412. When the outer thigh rod 2411 and the inner thigh rod 2412 overlap each other, and automatically lock via the spring cotter mechanism 2417, the handgrip screws 2415 are tightened to further assemble the outer thigh rod 2411 and the inner thigh rod 2412 into a whole body.

Figure 6:
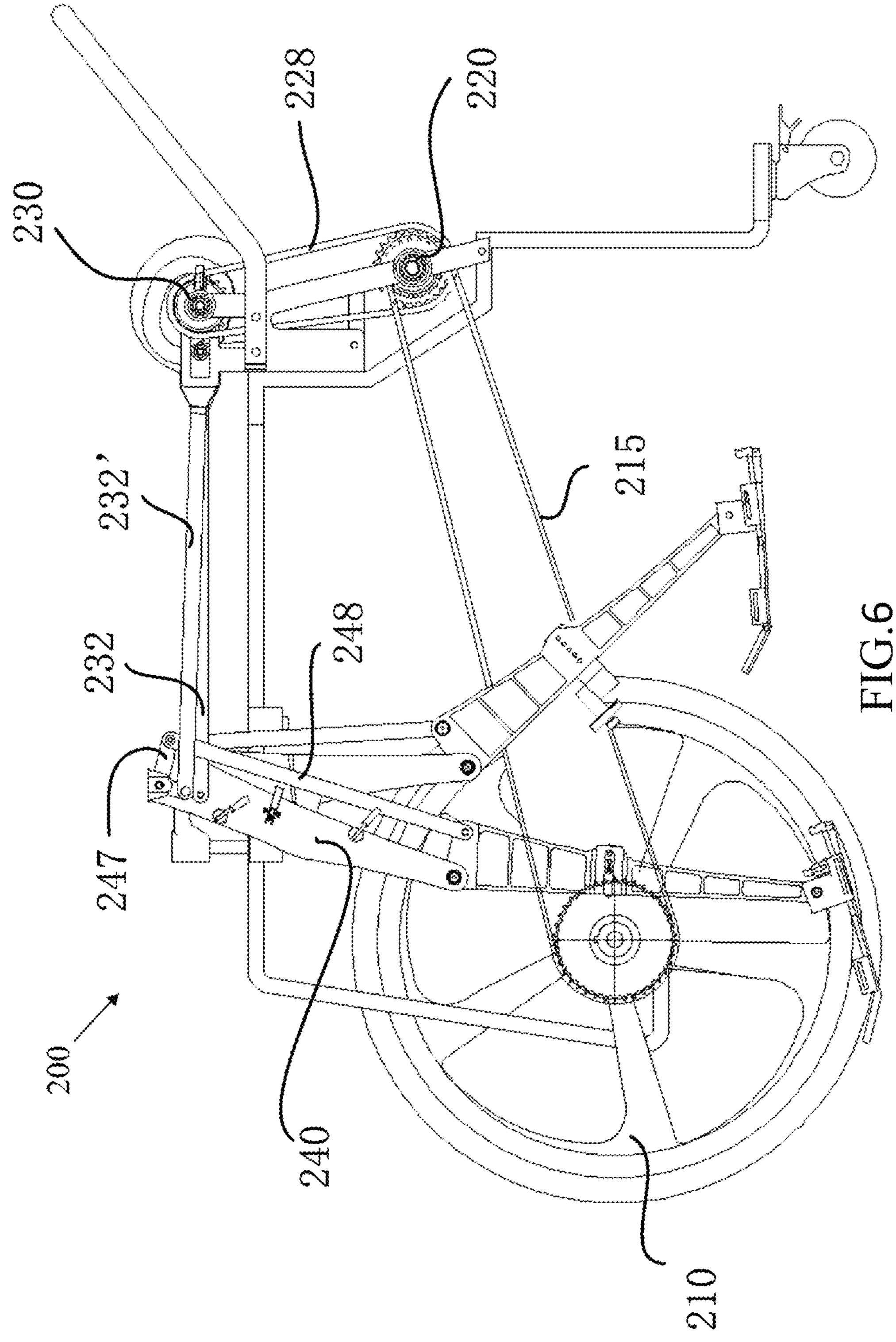
FIG. 6 is a side view of a transmission mechanism of the unpowered multi-joint synchronous training device in FIG. 1.

Referring to FIG. 6, FIG. 6 is a side view of the transmission mechanism 200, wherein some unnecessary members are omitted, such that structure of the transmission mechanism 200 can be shown more clearly. As is described above, when the training device is pushed forward, the wheel assembly 210 marches forward. Rotation of the wheel assembly 210 is delivered to the transmission assembly 220 via the transmission belt 215. A driving force of the transmission assembly 220 is delivered to the drive assembly 230 via the transmission belt 228 again to drive rotation of the cam in the drive assembly 230. With rotation of the cam, the first connecting rod 232 and the second connecting rod 232' drive the leg rod assembly 240 to perform regular oscillation. The first connecting rod 232 is directly connected to a thigh position of the leg rod assembly 240 close to the hip to drive the thigh of the patient to perform regular oscillation relative to the hip. The second connecting rod 232' is indirectly connected to a lower leg position of the leg rod assembly 240 close to the knee through the first follower rod 247 and the second follower rod 248 to drive the lower leg of the patient to perform regular oscillation relative to the hip, thereby realizing the object of walk rehabilitation training.

As is described above, by virtue of specially designed cam contour, the leg rod assembly 240 performs regular oscillation when the normal person walks. The cam contour is reversely designed according to oscillation rule of the leg when the normal person walks, in particular, oscillation rule of the hip position and the knee position of the leg when the normal person walks. As for the method of designing the cam contour, it just can be performed in a reverse way of oscillation of the leg rod assembly 240 driven by the drive assembly 230.

Figure 7:
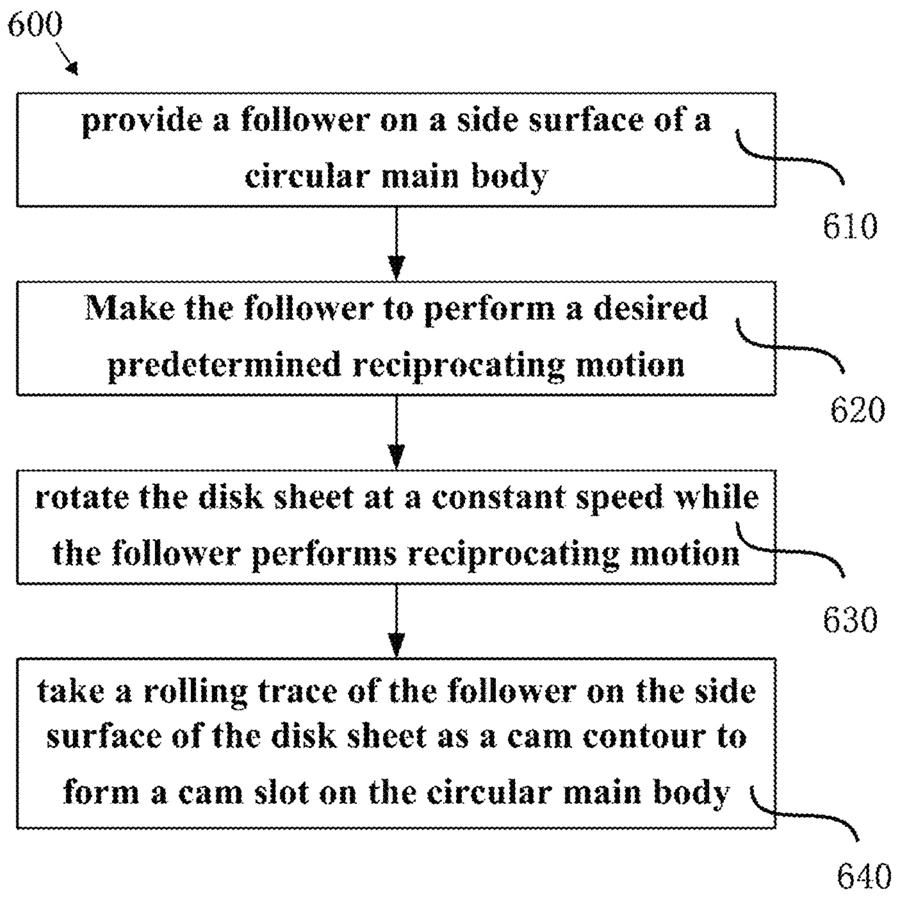
FIG. 7 is a flow diagram of a method of designing a cam contour of a cam slot of the cam assembly of the unpowered multi joint synchronous training device in FIG. 1.

FIG. 7 is a flow diagram of a method 600 of designing a cam contour of the cam slot of the drive assembly 230. Hereinafter the method 600 is described with reference to FIGS. 2 to 6. In a box 610, a follower is provided on a side surface of a disk sheet. As shown in FIG. 4, the follower can be a follower such as the follow-up roller 235, and can roll on the side surface of the disk sheet. Since the method 600 aims to design the cam contour of the cam slot, a circular disk having a flat side surface can be used to replace the cam 231 in FIG. 4. The follower is configured to be substantially movable only in the horizontal direction, for example, limiting displacement of the follower in the vertical direction by virtue of the guiding slot 253 and the oscillating rod 236 in FIG. 4.

In a box 620, a circular main body is provided, such that the follower is on a side surface of the circular main body, and performs a predetermined reciprocating motion (e.g., variable-speed reciprocating motion) on a predetermined distance in the substantially horizontal direction, and the predetermined distance, for example, is a distance defined by the positions C1 and C3 shown in FIGS. 10A to 10D.

In a box 630, the disk sheet rotates at a constant speed while the follower performs reciprocating motion, such that for each rotation of the disk sheet, the follower performs reciprocating motion once on the predetermined distance.

In a box 640, when the follower performs reciprocating motion once, the disk sheet also just rotates once. Accordingly, the follower forms a rolling trace of a non-circular closed curve on the side surface of the disk sheet during one reciprocating motion on the distance, and the closed curve is the cam contour desired by the cam slot. Therefore, the cam described in the invention can be obtained by forming the cam slot from the closed curve on the circular main body.

As is described above, the desired reciprocating motion preferably corresponds to oscillation of the thigh or the lower leg relative to the hip when the normal person walks. The two boundary points (e.g., the positions C1 and C3 shown in FIGS. 10A to 10D) of the predetermined distance correspond to two boundary angles of oscillation of the thigh or the lower leg relative to the hip when the normal person walks. When the reciprocating motion and the motion distance of the follower are oscillation and an oscillation angle of the thigh relative to the hip when the normal person walks, it is only necessary to connect the follower to the thigh portion (e.g., a position of the hole 2414 shown in FIG.

5) of the leg rod close to the hip through the connecting rod. Similarly, when the reciprocating motion and the motion distance of the follower are oscillation and an oscillation angle of the lower leg relative to the hip when the normal person walks, as shown in FIGS. 5 to 6, it is only necessary to connect the follower to the lower leg portion of the leg rod close to the knee through the connecting rod and the lower leg oscillating rod. That is, it is only necessary to connect the follower to the first follower rod (e.g., the first follower rod 247) and the second follower rod (e.g., the second follower rod 248) of the hip of the leg rod, and indirectly to the lower leg portion (e.g., a position of the hole 2421 shown in FIG. 5) of the leg rod close to the knee through the connecting rod (e.g., the second connecting rod 232') and the middle portion. When the leg rod is fixed to the leg of the normal person, not the leg of the patient, when the normal person performs normal walking action, the follower is driven to perform oscillation motion corresponding to walk of the normal person on an oscillation angle corresponding to walk of the normal person, so the trace left by the follower on the side surface of the disk sheet corresponds to oscillation of the lower leg or the thigh when the normal person walks, thereby obtaining the corresponding cam contour.

In other embodiments combinable with the embodiments of the invention, the cam contour also can be obtained through a method of software modeling. For example, a feature size of the leg of the human body and a basic structure of the training device may be modeled using computer assistant software (e.g., Solidworks), then a constraint load is added to the model according to rule of the reciprocating motion of the leg (e.g., the hip and the knee) in the process of walking of the normal person to make kinematic simulation calculation, thereby obtaining a gait displacement curve in walking of the normal person, and the gait displacement curve obtained by simulation is imported into the model of the basic structure of the training device, thereby reversely obtaining the cam contour. Advantage lies in that the leg of the patient in actual use may be measured to be able to customize the most suitable cam contour for particular patient, thereby improving the effect of rehabilitation training.

As for the non-circular gear pair, the manufacturing method can be as follows:

Firstly, a driving non-circular gear and a driven non-circular gear are manufactured, wherein the driving non-circular gear and the driven non-circular gear have the same number of teeth and a fixed center distance, such that for each rotation of the driving non-circular gear 810, the driven non-circular gear 820 also rotates once, and it is ensured that the driving non-circular gear 810 and the driven non-circular gear 820 can be engaged together when the driving non-circular gear 810 and the driven non-circular gear 820 rotate to any position without separation or extrusion from each other. In some embodiments, axes of rotation of the driving non-circular gear and the driven non-circular gear are designed to deviate from geometric centers.

Subsequently, a follower is formed on a side surface of the driven non-circular gear to complete manufacture of the non-circular gear pair.

In the process of manufacturing, a pitch line of the driving non-circular gear and the driven non-circular gear is designed such that for each rotation of the driving non-circular gear, the driving non-circular gear may drive the follower disposed on the driven non-circular gear to perform variable-speed reciprocation motion once between a first position and a second position. The first position is a position of the follower closest to an axis of rotation of the driving non-circular gear, and the second position is a position of the follower farthest from the axis of rotation of the driving non-circular gear.

When the follower is connected to other member (e.g., the leg rod assembly 240) driven by the follower, the variable-speed reciprocation motion of the follower may drive the member connected thereto (e.g., through the connecting rod) to perform variable-speed oscillation within a certain angular range. For example, according to the embodiments of the invention, the follower can be connected to the leg rod assembly 240 at the position corresponding to the thigh or the position corresponding to the lower leg in the leg rod assembly 240 through the connecting rod. Taking the follower connected to the position corresponding to the thigh in the leg rod assembly 240 for example, the variable-speed reciprocation motion of the follower may drive the thigh position of the leg rod assembly 240 to perform variable-speed oscillation with the hip as an axis following an oscillation way of the thigh relative to the hip when the normal person walks. The oscillation angle driven by the variable-speed reciprocation motion corresponds to an oscillation angle of the thigh relative to the hip when the normal person walks. The two boundary positions (i.e., the first position and the second position) of the reciprocation motion of the follower correspond to two boundary angles of oscillation of the thigh when the normal person walks. For example, when the follower is connected to the leg rod of the left leg, the first position corresponds to a lower boundary angle of the left leg relative to the hip after the right leg takes one step with the left leg as a supporting leg, and the second position corresponds to a lower boundary angle of the left leg relative to the hip after the left leg takes one step with the right leg as a supporting leg.

As for design of the pitch line of the driving non-circular gear and the driven non-circular gear, it may be designed by the conventional method, i.e., determining a pitch curve, the number of models, the number of teeth and a center distance.

The pitch curve is obtained by the desired predetermined oscillation rule. For example, in the embodiments of the invention, the desired predetermined oscillation rule is variable-speed oscillation rule of the leg (the thigh or the lower leg) relative to the hip when the normal person walks. If a rotation angle of the driving non-circular gear is used as a time reference, the leg rod driven by the non-circular gear pair performs oscillation according to the time reference and the predetermined rule. At this time, a motion curve of the driven non-circular gear does not exist, so the driven non-circular gear is driven by the leg rod through the connecting rod. Since oscillation of the driving non-circular gear and the leg rod uses the same time reference, when the driving non-circular gear rotates once, the driven non-circular gear also just rotates once. At each moment, a rotational speed of the driven non-circular gear driven by the leg rod does not equal to a constant speed of the driving non-circular gear, but integral of the rotational speed over time shall be equal to 360° within one rotational period of one driving non-circular gear. However, in actual engineering calculation, due to influence of a round-off error and a sampling density, a result of numerical integration has few deviation, and shall be corrected by proportion to control an error of the numerical integration within an allowable range.

As for determination of the number of models, the number of teeth and the center distance, preferably, the non-circular gear pair uses a standard number of models to facilitate processing with standard cutting tools. After the number of models is determined, based on the given number of teeth, a perimeter of the pitch line of the non-circular gear is determined. An instantaneous transmission ratio of the non-circular gear pair equals to an inverse ratio of rotation radiuses of an engaging point where the driving non-circular gear and the driven non-circular gear engage with each other on a pair of pitch lines at this moment. Moreover, a sum of radiuses of each pair of pitch lines equals to a center distance of the non-circular gear pair. Since the pitch line is non-circular, the center distance, the number of models and the number of teeth do not have a simple proportional relation any longer as the circular gear pair. That is, if the standard number of models is used, a non-standard center distance occurs, and vice versa. Since a radius of the pitch line at each point shall be firstly determined before numerical integration of the perimeter of the pitch line, the radius of the pitch line is obtained according to the center distance and the instantaneous transmission ratio, firstly, one center distance shall be assumed, and accordingly, the perimeter of the pitch line is calculated. An error of the perimeter of the pitch line is finally less than an allowable value by adjusting the center distance. The non-circular gear pair designed in such way has the standard number of models and the non-standard center distance. It is easily manufactured to have the standard number of models and the non-standard center distance.

As shown in FIG. 1, the training device 10 has a waist retaining assembly 300 attached to a top of the body frame 100 for providing power support to the waist in the process of rehabilitation training of paraplegic and hemiplegic patients, so as to allow the patient to walk upright. A contact portion between the waist retaining assembly 300 and the patient may be provided with a high polymer material bandage, and filled with soft and comfortable foamed rubber, thereby increasing wearing comfort and use experience of the patient.

In other embodiments combinable with some embodiments of the invention, the waist retaining assembly 300 comprises a waist retainer 310 in contact with the patient and a waist retainer support 320 attaching the waist retainer 310 to the body frame 100. The waist retainer 310 is above the body frame 100 and extends between both sides of the body frame 100. In the process of walking of the normal person, a center of gravity of the human body has a quantity of floating of about 20 to 30 mm in a vertical direction. The waist retainer support 320 is configured to float up and down in the vertical direction to cooperate with floating of the center of gravity of the human body in the vertical direction during walking of the normal person.

Figure 8:
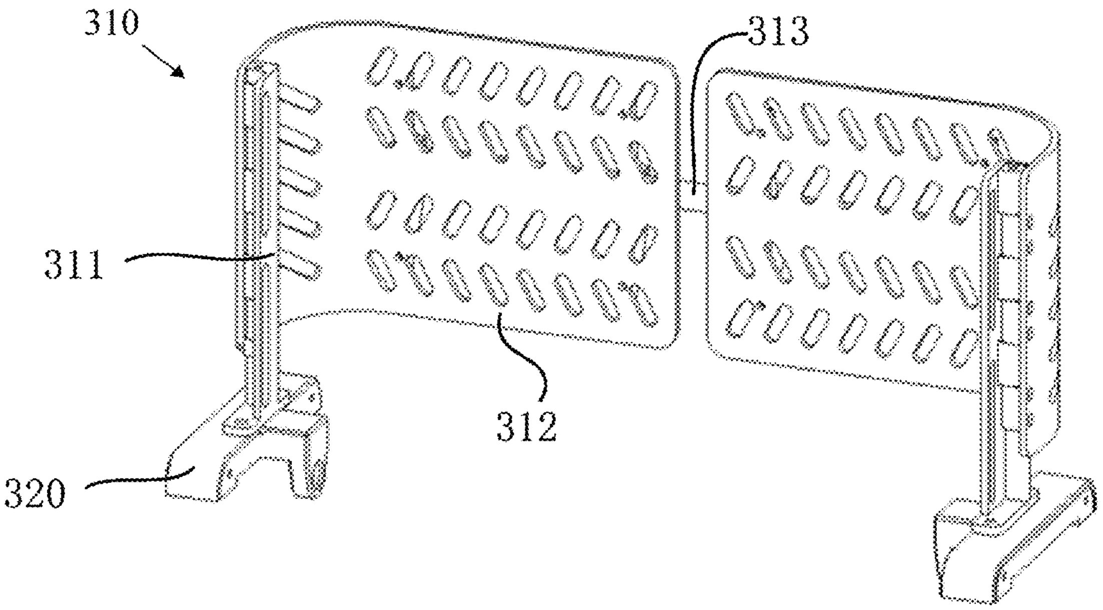
FIG. 8 is a perspective diagram of a waist retainer of the unpowered multi-joint synchronous training device in FIG. 1.

FIG. 8 is a perspective diagram of the waist retainer 310. As shown in FIG. 8, the waist retainer 310 comprises a pair of brackets 311 fixed to the waist retainer support 320, and a pair of baffle plates 312 pivoted to the corresponding brackets 311 at one end, such that the baffle plates 312 may be opened and closed, thereby facilitating the paraplegic patient to convert at spatial positions of wearing in a sitting posture and walking in a standing posture. The waist retainer 310 further comprises a bolt 313 detachably connected to the baffle plates 312, thereby ensuring integral rigidity and stability of the waist retainer 310 after the baffle plates 312 are closed. The bolt 313 may be a carbon fiber material.

Figure 9:
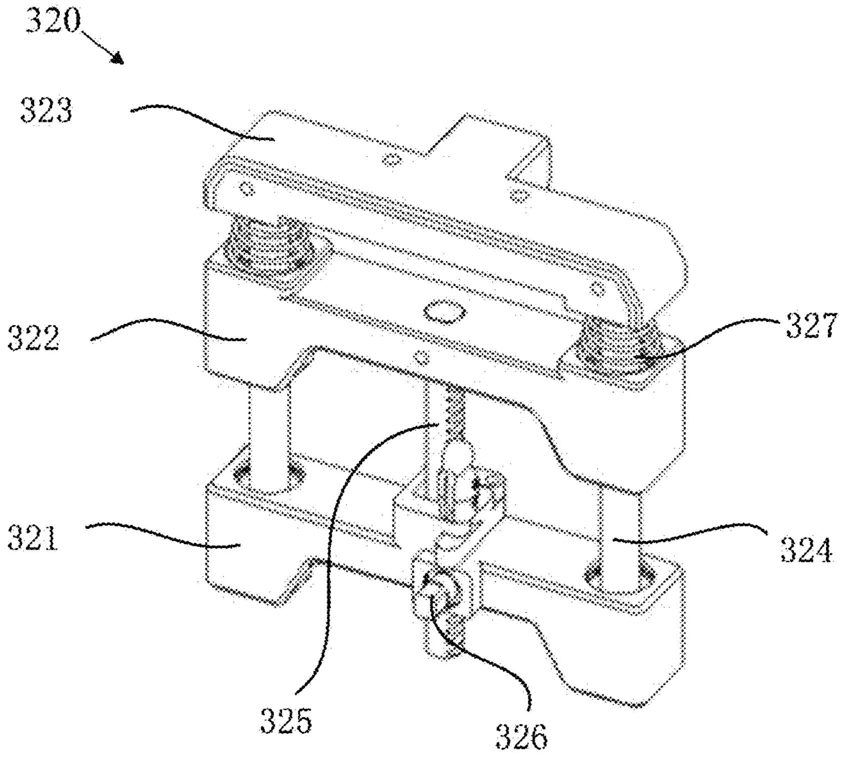
FIG. 9 is a perspective diagram of a waist retainer support of the unpowered multi joint synchronous training device in FIG. 1.

Referring to FIG. 9, FIG. 9 is a perspective diagram of the waist retainer support 320. The retainer support 320 comprises a fixing portion or fixing pedestal 321 attached to the top of the body frame 100, an adjusting portion or adjusting pedestal 322 and a floating portion or floating pedestal 323 connected to the waist retainer 310. The fixing portion 321 is formed with holes at both ends, and an optical axis 324 passes through the holes of the fixing portion 321 and is assembled with the fixing portion 321 through a linear bearing (not shown), such that the optical axis 324 can move in the holes of the fixing portion 321 in a vertical direction. The adjusting portion 322 is also formed with holes at both ends, and attached to the optical axis 324 at the opening through the linear bearing (not shown), and the adjusting portion 322 may move up and down along an extending direction (the vertical direction) of the optical axis 324. A top of the optical axis 324 is connected to the floating portion 323. The adjusting portion 322 is further connected to the fixing portion 321 through a lifting screw rod 325 (such as, a cylindrical screw rod), and adjusts a distance between the fixing portion 321 and the adjusting portion 322 in the vertical direction through an adjusting mechanism 326 on the fixing portion 321. The floating portion 323 is further connected to the adjusting portion 322 through an elastic member 327 (such as, a tower spring). The distance between the adjusting portion 322 and the fixing portion 321 in the vertical direction may be adjusted by adjusting the lifting screw rod 325. In other words, a position of the adjusting portion 322 relative to the body frame 100 in the vertical direction may be adjusted, thereby adjusting a vertical position of the waist retainer 310 connected to the waist retainer support 320, so it may be possible to provide mounting positions of different waist retainers 310 for different heights of patients. Since the floating portion 323 is connected to the adjusting portion 322 through the elastic member 327, when the patient uses for rehabilitation training, the floating portion 323 can float up and down together with the waist retainer 310 connected to the floating portion 323 correspondingly relative to the adjusting portion 322 according to the quantity of floating of the center of gravity of the human body in the vertical direction when the patient walks.

To sum up, the training device in the invention realizes walk rehabilitation training of the patient only through simple mechanical structure without assistance of electronic devices. Therefore, the manufacturing cost is low while saving the expensive research and development fees desired for developing an intelligent control program matched with the training device having electronic devices. Only one medical worker or even a normal operator may provide walk rehabilitation training for the patient, thereby improving durability and treatment effect of the rehabilitation training.

Of course, the invention also may have various other embodiments, and those skilled in the art may make various corresponding modifications and variations without departing from spirit and essence of the invention, but these corresponding modifications and variations shall belong to the scope protected by the appended claims of the invention.

What is claimed is:

1. A cam for an unpowered multi-joint synchronous training device, wherein the cam has a circular main body, a cam slot is disposed on a first side surface of the circular main body, and a contour of the cam slot is configured such that rotational movement of the cam drives a follower provided in the cam slot to perform variable-speed reciprocating motion along a predetermined horizontal axis, wherein, for each rotation of the cam, the follower performs the variable-speed reciprocating motion once between a first position and a second position on the predetermined horizontal axis;

the first position is a position of the follower along the horizontal axis when the follower is at a position of the contour closest to a center of the circular main body, and the second position is a position of the follower along the horizontal axis when the follower is at the position of the contour farthest from the center of the circular main body; and the variable-speed reciprocating motion drives a driven object connected to the follower to perform variable-speed oscillation within a first range of angles.

2. The cam according to claim 1, wherein the driven object is a thigh of a user of the training device, the first range of angles is a range of oscillation angles of a thigh of a person without physical disability with a hip as an axis when the person without physical disability walks, and the variable-speed oscillation is oscillation of the thigh of the person without physical disability when the person without physical disability walks.

3. The cam according to claim 1, wherein the cam further comprises a second cam slot disposed on a second side surface opposite to the first side surface of the circular main body, and a second contour of the second cam slot is configured such that rotational movement of the cam drives a second follower provided in the second cam slot to perform another variable-speed reciprocating motion along the horizontal axis, the second contour being different from the contour, wherein, for each rotation of the cam, the second follower performs the another variable-speed reciprocating motion once between a third position and a fourth position on the predetermined horizontal axis;

the third position is a position of the second follower along the horizontal axis when the second follower is at a position of the second contour closest to the center of the circular main body, and the fourth position is a position of the second follower along the horizontal axis when the second follower is at the position of the second contour farthest from the center of the circular main body; and the another variable-speed reciprocating motion drives another driven object connected to the second follower to perform another variable-speed oscillation within a second range of angles.

4. The cam according to claim 3, wherein the another driven object is a lower leg of a user of the training device, the second range of angles is a range of oscillation angles of a lower leg of a person without physical disability with a hip as an axis when the person without physical disability walks, and the another variable-speed oscillation is oscillation of the lower leg of the person without physical disability when the person without physical disability walks.

5. A non-circular gear pair for an unpowered multi-joint synchronous training device, comprising a driving non-circular gear and a driven non-circular gear in driving engagement with the driving non-circular gear, wherein the driving non-circular gear and the driven non-circular gear have the same number of teeth and a fixed center distance;

a pitch line of the driving non-circular gear and the driven non-circular gear is configured such that for each rotation of the driving non-circular gear, the driving non-circular gear drives a follower disposed on a first side surface of the driven non-circular gear to perform variable-speed reciprocating motion once between a first position and a second position;

the first position is a position of the follower closest to an axis of rotation of the driving non-circular gear, and the second position is a position of the follower farthest from the axis of rotation of the driving non-circular gear; and the variable-speed reciprocating motion drives a driven object connected to the follower to perform variable-speed oscillation within a first range of angles.

6. The non-circular gear pair according to claim 5, wherein the driven object is a thigh or a lower leg of a user of the training device, the first range of angles is a range of oscillation angles of a thigh of a person without physical disability with a hip as an axis or an oscillation angle of a lower leg of the person without physical disability with the hip as an axis when the person without physical disability walks, and the variable-speed oscillation is oscillation of the thigh or the lower leg of the person without physical disability when the person without physical disability walks.

7. A method of manufacturing a cam, comprising the steps of:

(a) providing a circular main body, and disposing a follower on a side surface of the circular main body, the follower being movable on the side surface only in a horizontal direction;

(b) allowing the follower to perform variable-speed reciprocating motion once between a first position and a second position on the side surface of the circular main body;

(c) rotating the circular main body at a constant speed while executing the step (b), wherein a period when the follower performs the variable-speed reciprocating motion once is the same as a period when the circular main body rotates once; and (d) taking a trace of movement of the follower on the side surface of the circular main body as a cam contour to form a cam slot on the side surface of the circular main body, wherein a distance between the first position and a center of the circular main body is equal to a distance between a position of the cam contour closest to the center of the circular main body, and a distance between the second position and the center is equal to a distance between a position of the cam contour farthest from the center of the circular main body.

8. The method according to claim 7, further comprising the step of: providing a leg rod fixed to a leg of a person without physical disability, the leg rod having a thigh portion and a lower leg portion connected to each other, connecting the follower to the thigh portion or the lower leg portion through a connecting rod, and driving the follower to perform the variable-speed reciprocating motion using variable-speed oscillation of a thigh of the person without physical disability with a hip as an axis when the person without physical disability walks, or driving the follower to perform the variable-speed reciprocating motion using variable-speed oscillation of a lower leg of the person without physical disability with the hip as an axis when the person without physical disability walks.

9. A method of manufacturing a non-circular gear pair, comprising the steps of:

providing a driving non-circular gear and a driven non-circular gear engaged with each other, wherein the driving non-circular gear and the driven non-circular gear have the same number of teeth and a fixed center distance, and disposing a follower on a side surface of the driven non-circular gear, wherein a pitch line of the driving non-circular gear and the driven non-circular gear is configured such that for each rotation of the driving non-circular gear, the driving non-circular gear drives the follower to perform variable-speed reciprocating motion once between a first position and a second position, wherein the first position is a position of the follower closest to an axis of rotation of the driving non-circular gear, and the second position is a position of the follower farthest from the axis of rotation of the driving non-circular gear; and the variable-speed reciprocating motion drives a driven object connected to the follower to perform variable-speed oscillation within a first range of angles.

10. The method of manufacturing a non-circular gear pair according to claim 9, wherein the driven object is a man's thigh or lower leg, the first range of angles is a range of oscillation angles of a thigh of a person without physical disability with a hip as an axis or a range of oscillation angles of a lower leg of the person without physical disability with the hip as an axis when the person without physical disability walks, and the variable-speed oscillation is oscillation of the thigh or the lower leg of the person without physical disability when the person without physical disability walks.

11. A transmission mechanism for an unpowered multi-joint synchronous training device, comprising:

a wheel assembly;

a transmission assembly in driving connection with the wheel assembly;

a drive assembly in driving connection with the transmission assembly, and having a cam; and a leg rod assembly connected to the drive assembly through a connecting rod, such that the leg rod assembly oscillates under driving of the transmission assembly, wherein the cam has a circular main body, a first cam slot disposed on a first side surface of the circular main body and a second cam slot disposed on a second side surface of the circular main body opposite to the first side surface, the first cam slot has a first contour and the second cam slot has a second contour different from the first contour, the first and second contour are configured such that rotational movement of the cam drives a first follower provided in the first cam slot and a second follower provided in the second cam slot to perform variable-speed reciprocating motion along a predetermined horizontal axis;

for each rotation of the cam, the first follower performs a first reciprocating motion once between a first position and a second position on the predetermined horizontal axis, and the second follower performs a second reciprocating motion once between a third position and a fourth position on the predetermined horizontal axis;

the first position is a position of the first follower along the horizontal axis when the first follower is at a position of the first contour closest to a center of the circular main body, and the second position is a position of the first follower along the horizontal axis when the first follower is at the position of the first contour farthest from the center of the circular main body;

the third position is a position of the second follower along the horizontal axis when the second follower is at a position of the second contour closest to the center of the circular main body, and the fourth position is a position of the second follower along the horizontal axis when the second follower is at the position of the second contour farthest from the center of the circular main body;

the first reciprocating motion drives a driven object connected to the first follower to perform variable-speed oscillation within a first range of angles, the second reciprocating motion drives another driven object connected to the second follower to perform another variable-speed oscillation within a second range of another angles.

12. The transmission mechanism according to claim 11, wherein the drive assembly further comprises:

a support for supporting the cam; and an oscillating rod having one end connected to a follower of the drive assembly, and the other end fixedly connected to the support.

13. The transmission mechanism according to claim 11, wherein the leg rod assembly comprises:

a thigh rod; and a lower leg rod connected to the thigh rod at a knee position of the leg rod assembly through a bearing;

wherein the connecting rod connects a third follower to the thigh rod, such that the thigh rod performs variable-speed oscillation within the first range of angles under driving of the third follower, the first range of angles is a range of oscillation angles of a thigh of a person without physical disability with a hip as an axis when the person without physical disability walks, and the variable-speed oscillation is oscillation of the thigh of the person without physical disability when the person without physical disability walks.

14. The transmission mechanism according to claim 13, further comprising:

a lower leg oscillating rod;

a second connecting rod having one end connected to the lower leg rod through the lower leg oscillating rod, the lower leg oscillating rod disposed at a position of the thigh rod corresponding to the hip, and the other end connected to the second follower of the drive assembly; and a second oscillating rod having one end connected to the second follower, and the other end fixedly connected to the support; wherein the second follower drives the lower leg rod to perform the another variable-speed oscillation within the second range of angles, the second range of angles is a range of oscillation angles of a lower leg of a person without physical disability with the hip as an axis when the person without physical disability walks, and the another variable-speed oscillation is oscillation of the lower leg of the person without physical disability when the person without physical disability walks.

15. A transmission mechanism for an unpowered multi-joint synchronous training device, comprising:

a wheel assembly;

a transmission assembly in driving connection with the wheel assembly;

a drive assembly in driving connection with the transmission assembly, and having a non-circular gear pair; and a leg rod assembly connected to the drive assembly through a connecting rod, such that the leg rod assembly oscillates under driving of the transmission assembly, wherein the non-circular gear pair comprising a driving non-circular gear and a driven non-circular gear in driving engagement with the driving non-circular gear, the driving non-circular gear and the driven non-circular gear have the same number of teeth and a fixed center distance, a pitch line of the driving non-circular gear and the driven non-circular gear is configured such that for each rotation of the driving non-circular gear, the driving non-circular gear drives a follower disposed on a first side surface of the driven non-circular gear to perform variable-speed reciprocating motion once between a first position and a second position;

the first position is a position of the follower closest to an axis of rotation of the driving non-circular gear, and the second position is a position of the follower farthest from the axis of rotation of the driving non-circular gear; and the variable-speed reciprocating motion drives a driven object connected to the follower to perform variable-speed oscillation within a first range of angles.

16. The transmission mechanism according to claim 15, wherein the leg rod assembly comprises:

a thigh rod; and a lower leg rod connected to the thigh rod at a knee position of the leg rod assembly through a bearing;

wherein the connecting rod connects a follower of the drive assembly to the thigh rod, such that the thigh rod performs variable-speed oscillation within the first range of angles under driving of the follower of the drive assembly, the first range of angles is a range oscillation angles of a thigh of a person without physical disability with a hip as an axis when the person without physical disability walks, and the variable-speed oscillation is oscillation of the thigh of the person without physical disability when the person without physical disability walks.

17. The transmission mechanism according to claim 15, further comprising:

another drive assembly, wherein the another drive assembly has the same configuration as that of the non-circular gear pair of the drive assembly;

a lower leg oscillating rod;

a second connecting rod having one end connected to the lower leg rod through the lower leg oscillating rod, the lower leg oscillating rod being configured to be disposed at a position of the thigh rod corresponding to a hip, and the other end connected to a second follower of the another drive assembly; and a second oscillating rod having one end connected to the second follower, and the other end fixedly connected to the support; wherein the second follower drives the lower leg rod to perform another variable-speed oscillation within a second range of angles, the second range angles is an oscillation angle of a lower leg of a person without physical disability with the hip as an axis when the person without physical disability walks, and the another variable-speed oscillation is oscillation of the lower leg of the person without physical disability when the person without physical disability walks.

18. An unpowered multi-joint synchronous training device, comprising:

a body frame; and a first transmission mechanism and a second transmission mechanism mounted on both sides of the body frame; wherein a drive assembly of the first transmission mechanism and a drive assembly of the second transmission mechanism are connected by a shaft lever, and have a directional difference of 180°, and the shaft lever comprises a first rod portion, and a second rod portion connected to the first rod portion through a clutch.

19. The unpowered multi-joint synchronous training device according to claim 18, wherein the first transmission mechanism and the second transmission mechanism are further connected by a second shaft lever, and have a differential mechanism mounted to the second shaft lever therebetween.

20. The unpowered multi-joint synchronous training device according to claim 18, further having:

a waist retainer connected to a top of the body frame and extending between both sides of the frame;

two waist retainer supports mounted to the top of the body frame and located on both sides of the body frame, the waist retainer support comprising:

a fixing pedestal fixedly connected to the body frame;

an adjusting pedestal connected to the fixing pedestal through a lifting screw; and a floating pedestal connected to the adjusting pedestal through an elastic member; wherein both ends of the waist retainer are connected to the floating pedestal of the corresponding waist retainer support.

21. The unpowered multi-joint synchronous training device according to claim 18, wherein each of the first and second transmission mechanism comprising:

a wheel assembly;

a transmission assembly in driving connection with the wheel assembly;

a drive assembly in driving connection with the transmission assembly, and having a cam; and a leg rod assembly connected to the drive assembly through a connecting rod, such that the leg rod assembly oscillates under driving of the transmission assembly, wherein the cam has a circular main body, a first cam slot disposed on a first side surface of the circular main body and a second cam slot disposed on a second side surface of the circular main body opposite to the first side surface, the first cam slot has a first contour and the second cam slot has a second contour different from the first contour, the first and second contours are configured such that rotational movement of the cam drives a first follower provided in the first cam slot and a second follower provided in the second cam slot to perform variable-speed reciprocating motion along a predetermined horizontal axis for each rotation of the cam, the first follower performs a first reciprocating motion once between a first position and a second position on the predetermined horizontal axis, and the second follower performs a second reciprocating motion once between a third position and a fourth position on the predetermined horizontal axis;

the first position is a position of the first follower along the horizontal axis when the first follower is at a position of the first contour closest to a center of the circular main body, and the second position is a position of the first follower along the horizontal axis when the first follower is at the position of the first contour farthest from the center of the circular main body;

the third position is a position of the second follower along the horizontal axis when the second follower is at a position of the second contour closest to the center of the circular main body, and the fourth position is a position of the second follower along the horizontal axis when the second follower is at the position of the second contour farthest from the center of the circular main body;

the first reciprocating motion drives a driven object connected to the first follower to perform variable-speed oscillation within a first range of angles, the second reciprocating motion drives another driven object connected to the second follower to perform another variable-speed oscillation within a second range of another angles.

22. The unpowered multi-joint synchronous training device according to claim 18, wherein each of the first and second transmission mechanism comprising:

a wheel assembly;

a transmission assembly in driving connection with the wheel assembly;

a drive assembly in driving connection with the transmission assembly, and having a non-circular gear pair; and a leg rod assembly connected to the drive assembly through a connecting rod, such that the leg rod assembly oscillates under driving of the transmission assembly, wherein the non-circular gear pair comprising a driving non-circular gear and a driven non-circular gear in driving engagement with the driving non-circular gear, the driving non-circular gear and the driven non-circular gear have the same number of teeth and a fixed center distance, a pitch line of the driving non-circular gear and the driven non-circular gear is configured such that for each rotation of the driving non-circular gear, the driving non-circular gear drives a follower disposed on a first side surface of the driven non-circular gear to perform variable-speed reciprocating motion once between a first position and a second position;

the first position is a position of the follower closest to an axis of rotation of the driving non-circular gear, and the second position is a position of the follower farthest from the axis of rotation of the driving non-circular gear; and the variable-speed reciprocating motion drives a driven object connected to the follower to perform variable-speed oscillation within a range of angles.

* * * * *